(12) United States Patent
Xu

(10) Patent No.: US 12,388,906 B2
(45) Date of Patent: Aug. 12, 2025

(54) REQUEST PROCESSING METHOD AND RELATED APPARATUS

(71) Applicant: HONOR DEVICE CO., LTD., Shenzhen (CN)

(72) Inventor: Zixiang Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/254,684

(22) PCT Filed: May 16, 2022

(86) PCT No.: PCT/CN2022/092926
§ 371 (c)(1),
(2) Date: May 26, 2023

(87) PCT Pub. No.: WO2023/024589
PCT Pub. Date: Mar. 2, 2023

(65) Prior Publication Data
US 2024/0305695 A1    Sep. 12, 2024

(30) Foreign Application Priority Data

Aug. 25, 2021   (CN) .......................... 202110993034.5

(51) Int. Cl.
*H04L 67/562* (2022.01)
*H04L 69/322* (2022.01)
(52) U.S. Cl.
CPC .......... *H04L 67/562* (2022.05); *H04L 69/322* (2013.01)

(58) Field of Classification Search
CPC . G06F 9/54; G06F 9/545; G06F 9/547; H04L 67/566; H04L 67/562
See application file for complete search history.

(56) References Cited

U.S. PATENT DOCUMENTS

| | | | |
|---|---|---|---|
| 10,019,298 B2 * | 7/2018 | Yim ........................ | G06F 9/545 |
| 10,057,382 B2 * | 8/2018 | Sathyadevan ........... | H04L 69/08 |
| 10,097,532 B2 | 10/2018 | Kawabata et al. | |

(Continued)

FOREIGN PATENT DOCUMENTS

| | | |
|---|---|---|
| CN | 105808320 A | 7/2016 |
| CN | 109669723 A | 4/2019 |

(Continued)

*Primary Examiner* — Alex H. Tran

(57) ABSTRACT

A request processing method includes: Requests of a plurality of invokers are sent to a Server end of a first device interface. The request carries information indicating an invoker to which the request belongs. Then, response data that corresponds to each request and that is returned by the server end of the first device interface is received. The response data corresponding to the request carries information indicating an invoker to which the request belongs. Further, for the response data corresponding to each request, an invoker to which the response data corresponding to the request belongs can be identified based on the information that is carried in the response data corresponding to the request and that is used to indicate the invoker to which the request belongs, and the response data corresponding to the request can be returned to the invoker to which the response data corresponding to the request belongs.

15 Claims, 25 Drawing Sheets

(56) References Cited

U.S. PATENT DOCUMENTS

| | | | | |
|---|---|---|---|---|
| 11,190,609 B2* | 11/2021 | Siefker | ............... | H04L 12/4645 |
| 12,105,606 B2* | 10/2024 | Jiang | ..................... | H04W 24/04 |
| 2012/0054851 A1* | 3/2012 | Piazza | ................... | H04L 69/163 |
| | | | | 709/219 |
| 2018/0052723 A1 | 2/2018 | Yim et al. | | |
| 2023/0110131 A1* | 4/2023 | Smith | ..................... | H04L 69/18 |
| | | | | 370/254 |
| 2023/0254575 A1 | 8/2023 | Zhang et al. | | |
| 2024/0121840 A1* | 4/2024 | Wu | ....................... | H04W 8/005 |

FOREIGN PATENT DOCUMENTS

| | | | | | |
|---|---|---|---|---|---|
| CN | 111813724 | A | | 10/2020 | |
| CN | 111880866 | A | | 11/2020 | |
| CN | 112769837 | A | | 5/2021 | |
| CN | 112969024 | A | | 6/2021 | |
| CN | 109669723 | B | * | 6/2023 | ........... G06F 9/3836 |

* cited by examiner

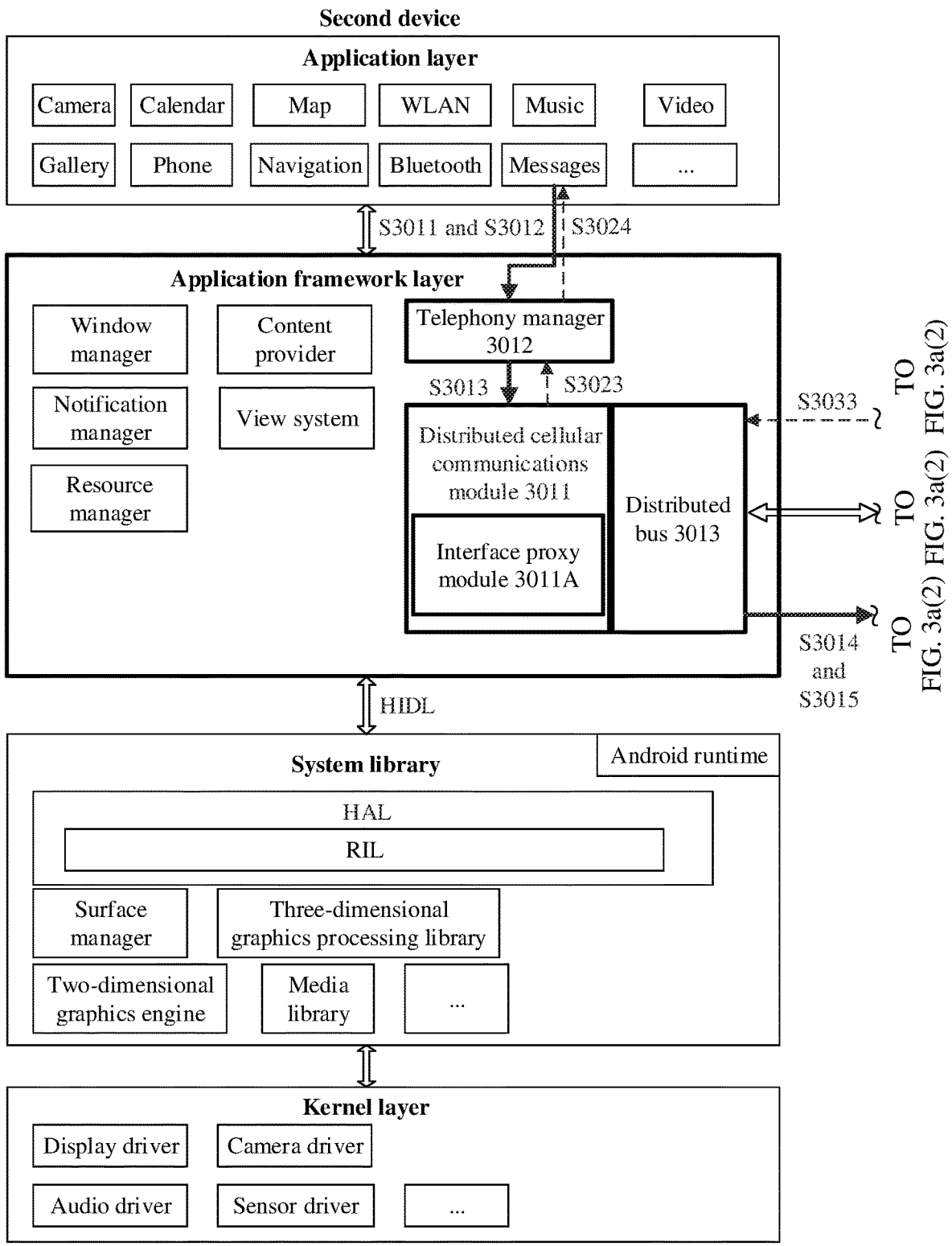
FIG. 3a(1)

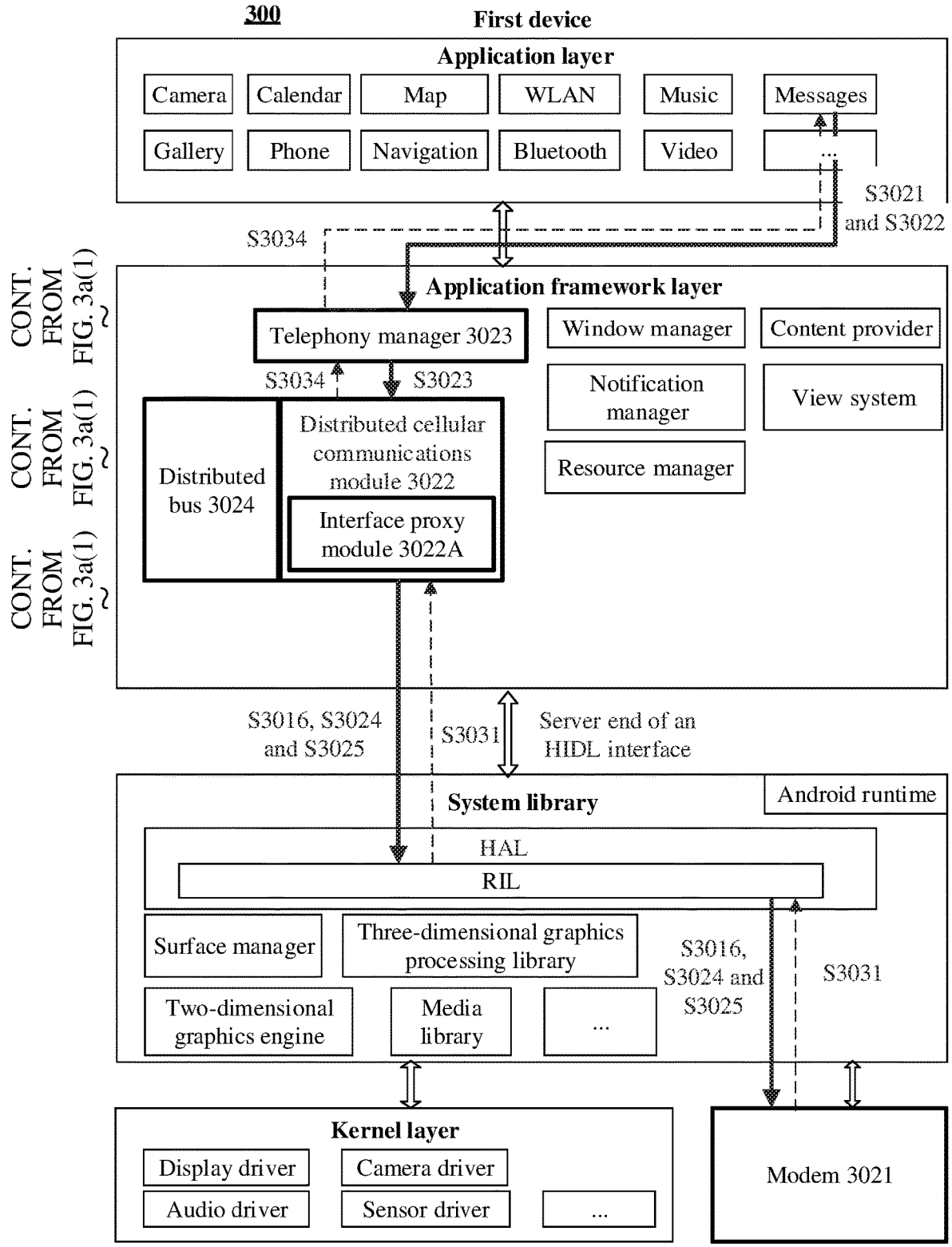
FIG. 3a(2)

CONT.
FROM
FIG. 4A

S410. Send a request of each invoker to a modem of the first device by using a server end of the HIDL interface of the first device S411. The modem of the first device obtains response data corresponding to each request through processing S412. The modem of the first device returns the response data corresponding to each request to the proxy object of the client end of the HIDL interface of the first device by using the server end of the HIDL interface S413. Identify, for the response data corresponding to each request based on a processed serial parameter in the response data corresponding to the request, an invoker to which the response data corresponding to the request belongs S414. Return response data belonging to the invoker on the second device to the second device

CONT.
FROM
FIG. 4A

S417. Restore, for each piece of response data belonging to the invoker on the first device, a processed serial parameter in the response data corresponding to the request S418. Return response data of each request of the first device to an invoker to which the response data corresponding to the request belongs S415. Restore, for response data corresponding to each request of the second device, a processed serial parameter in the response data corresponding to the request S416. Return each piece of response data of the second device to an invoker to which the response data belongs

FIG. 4B

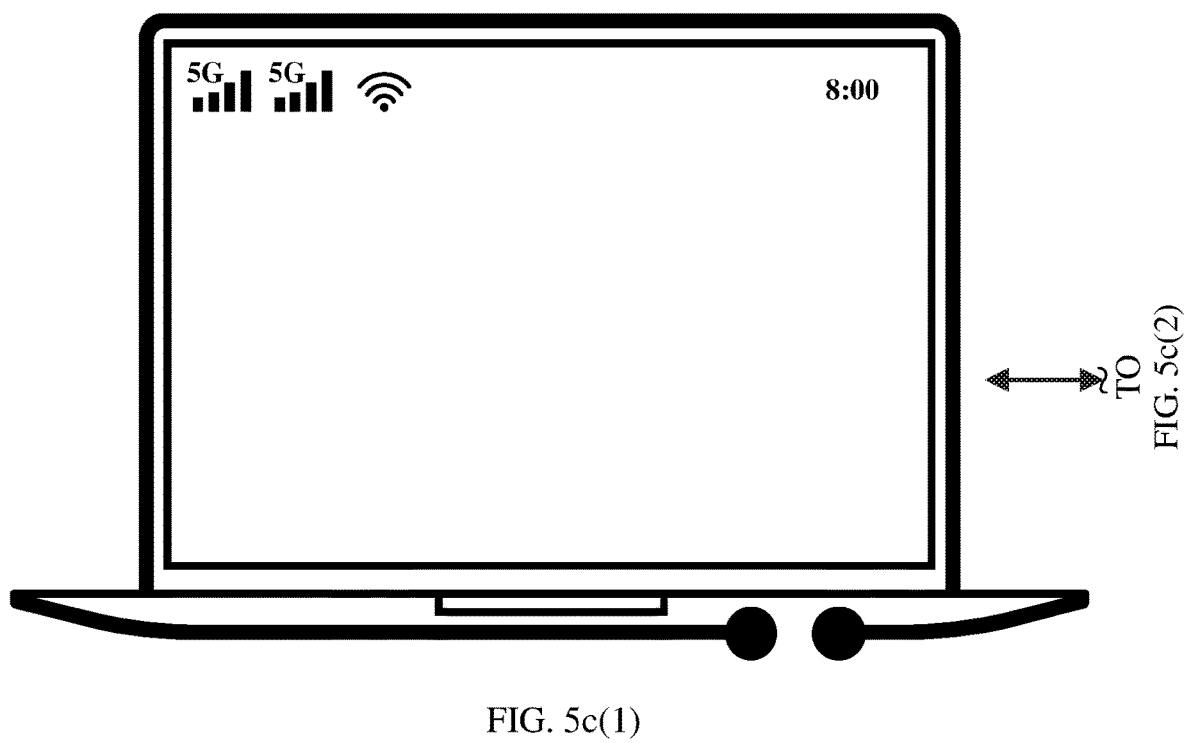
FIG. 5c(1)

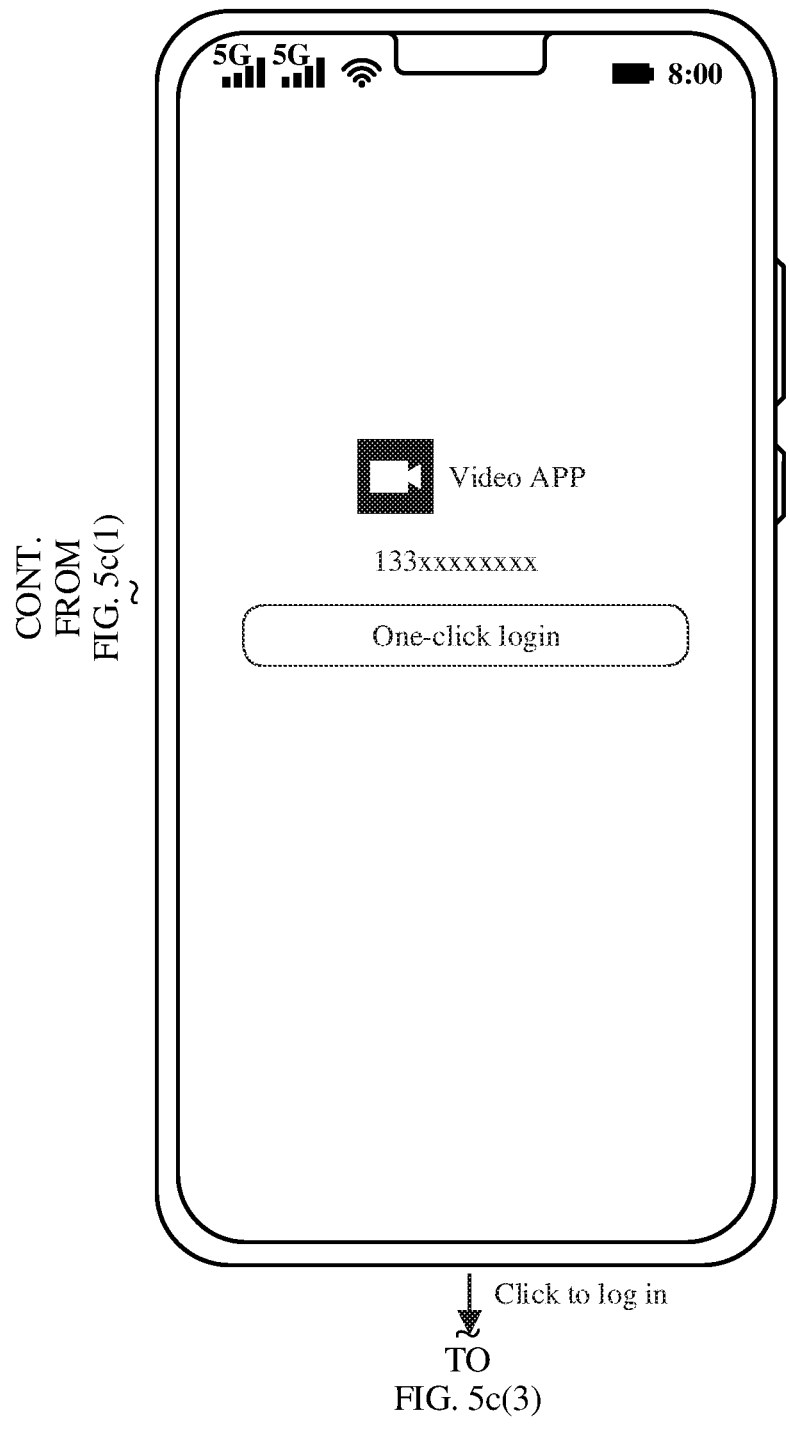
FIG. 5c(2)

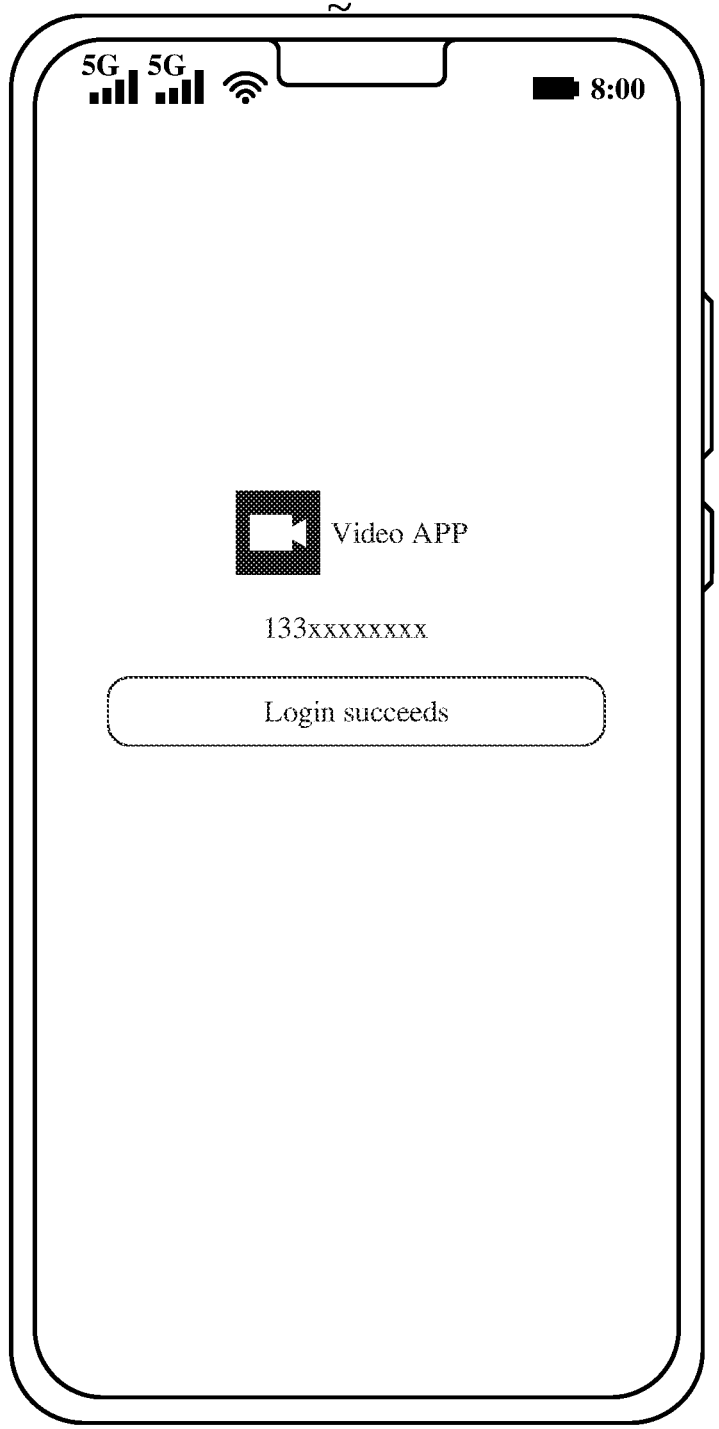
FIG. 5c(3)

REQUEST PROCESSING METHOD AND RELATED APPARATUS

CROSS-REFERENCE TO RELATED APPLICATIONS

This application is a national stage of International Application No. PCT/CN2022/092926 filed on May 16, 2022, which claims priority to Chinese Patent Application No. 202110993034.5 filed on Aug. 25, 2021. The disclosures of both of the aforementioned applications are hereby incorporated by reference in their entireties.

TECHNICAL FIELD

This application relates to the field of electronic information technologies, and in particular, to a request processing method and a related apparatus.

BACKGROUND

In the conventional technology, an application side usually interacts with a modem and a hardware abstraction layer (Hardware Abstraction Layer, HAL) of the modem by invoking an HAL interface definition language (HAL interface definition language, HIDL) interface. The HIDL interface has implementations at a client (Client) end and a server (Server) end. The client end refers to a party that invokes a method through the HIDL. The server end refers to a party that implements the HIDL interface, accepts invocation of the client end, and returns data.

Specifically, a solution in which an application side delivers a request to a modem (Modem) for processing is as follows: When an invoker on the application side delivers a request, a client end of an HIDL interface corresponding to the invoker is invoked, the request delivered by the invoker is processed at a server end of an HIDL interface at an HAL layer, the server end of the HIDL interface delivers the request to the modem, and the modem performs processing to obtain response data corresponding to the request. However, in the existing solution in which the application side delivers the request to the modem for processing, client ends and server ends of HIDL interfaces are one-to-one bound. A server end of each HIDL interface is fixedly registered with a client end of one HIDL interface. To be specific, a server end of one HIDL interface can only fixedly receive a request delivered by a client end of one HIDL interface and return a result to the client end, and a function that a server end of one HIDL interface simultaneously processes requests delivered by client ends of a plurality of HIDL interfaces is not supported.

SUMMARY

This application provides a request processing method and a related apparatus, to resolve a problem that a server end of one HIDL interface is not supported in simultaneously processing requests delivered by client ends of a plurality of HIDL interfaces.

To achieve the foregoing objective, this application provides the following technical solutions.

According to a first aspect, this application discloses a request processing method, applied to a first device. The request processing method includes: sending requests of a plurality of invokers to a server Server end of a first device interface, where the request carries information used to indicate an invoker to which the request belongs; receiving response data that corresponds to each request and that is returned by the server end of the first device interface, where the response data corresponding to the request carries information used to indicate an invoker to which the request belongs; identifying, for the response data corresponding to each request based on the information that is carried in the response data corresponding to the request and that is used to indicate the invoker to which the request belongs, an invoker to which the response data corresponding to the request belongs; and returning, for the response data corresponding to each request, the response data corresponding to the request to the invoker to which the response data corresponding to the request belongs.

In this embodiment of this application, the invoker to which the response data corresponding to the request belongs is identified based on the information that is carried in the response data corresponding to the request and that is used to indicate the invoker to which the request belongs, and then the response data corresponding to each request can be returned to the invoker to which the response data belongs. This meets a requirement that client ends of a plurality of HIDL interfaces simultaneously process requests delivered by a plurality of invokers.

In a possible implementation, the first device interface is an HIDL interface of the first device, and after the sending requests of a plurality of invokers to a server Server end of a first device interface, the method further includes: sending a request of each invoker to a modem of the first device by using a server end of the HIDL interface of the first device; processing each request by using the modem of the first device, to obtain the response data corresponding to each request; and receiving the response data that corresponds to each request and that is returned by the modem by using the server end of the HIDL interface of the first device. In some other embodiments, the first device interface may alternatively be another type of interface. This is not limited.

In another possible implementation, the sending a request of each invoker to a modem of the first device by using a server end of the HIDL interface of the first device includes: invoking the server end of the HIDL interface of the first device by using an interface proxy module, to send the request of each invoker to the modem of the first device. The interface proxy module pre-creates a proxy object of a client end of an HIDL interface corresponding to each invoker. The receiving the response data that corresponds to each request and that is returned by the modem by using the server end of the HIDL interface of the first device includes: receiving, by using the interface proxy module, the response data that corresponds to each request and that is returned by the modem by using the server end of the HIDL interface of the first device.

In another possible implementation, the requests of the plurality of invokers include a request of an invoker on the first device and/or a request of an invoker on a second device.

In another possible implementation, before the sending requests of a plurality of invokers to a server Server end of a first device interface, the method further includes: processing, for the request of each invoker, a serial serial parameter in the request based on an identifier of the invoker, so that a processed serial parameter in the request can be used to indicate the invoker to which the request belongs. The information used to indicate the invoker to which the request belongs is the processed serial parameter in the request. Before the returning, for the response data corresponding to each request, the response data corresponding to the request to the invoker to which the response data corresponding to the request belongs, the method further includes: restoring, for the response data corresponding to each request, a processed serial parameter in the response data corresponding to the request.

In another possible implementation, the processing, for the request of each invoker, a serial parameter in the request based on an identifier of the invoker, so that a processed serial parameter in the request can be used to indicate the invoker to which the request belongs includes: offsetting, for the request of each invoker based on the identifier of the invoker, the serial parameter in the request by an offset value corresponding to the invoker, so that the processed serial parameter in the request can be used to indicate the invoker to which the request belongs.

The serial parameter in the request is offset by the offset value corresponding to the invoker, so that the offset-processed serial parameter can be used to indicate the invoker to which the request belongs.

In another possible implementation, the identifying, for the response data corresponding to each request based on the processed serial parameter in the response data corresponding to the request, an invoker to which the response data corresponding to the request belongs includes: performing, for the response data corresponding to each request, matching between the processed serial parameter in the response data corresponding to the request and a serial parameter value range corresponding to each invoker, and determining a matched invoker as the invoker to which the response data corresponding to the request belongs.

In another possible implementation, the information used to indicate the invoker to which the request belongs is an identifier of the invoker to which the request belongs. The receiving response data that corresponds to each request and that is returned by the server end of the first device interface includes: receiving, by using a client end of the first device interface, the response data that corresponds to each request and that is returned by the server end of the first device interface. A field used to support receiving of an identifier of each invoker is preset in the client end of the first device interface, and a field used to support receiving of the identifier of each invoker is preset in the server end of the first device interface.

The field used to support receiving of the identifier of each invoker is preset in the client end of the first device interface, and the field used to support receiving of the identifier of each invoker is preset in the server end of the first device interface. Therefore, both the client end and the server end can support receiving of the request and the response data that carry the identifier of the invoker to which the request belongs.

In another possible implementation, if the requests of the plurality of invokers include the request of the invoker on the first device and the request of the invoker on the second device, before the sending requests of a plurality of invokers to a server Server end of a first device interface, the method further includes: processing, for a request of each invoker on the first device, a serial parameter in the request based on an identifier of the invoker, so that a processed serial parameter in the request can be used to indicate the invoker to which the request belongs, or processing, for a request of each invoker on the first device and the second device, a serial parameter in the request based on an identifier of the invoker, so that a processed serial parameter in the request can be used to indicate the invoker to which the request belongs. Information used to indicate the invoker to which the request belongs is the processed serial parameter in the request.

In another possible implementation, before the returning, for the response data corresponding to each request, the response data corresponding to the request to the invoker to which the response data corresponding to the request belongs, the method further includes: restoring, for response data corresponding to each request belonging to the first device, a processed serial parameter in the response data corresponding to the request, or restoring, for response data corresponding to each request belonging to the first device and the second device, a processed serial parameter in the response data corresponding to the request.

In another possible implementation, the processing a serial parameter in the request, so that a processed serial parameter in the request can be used to indicate the invoker to which the request belongs includes: offsetting, based on the identifier of the invoker, the serial parameter in the request by an offset value corresponding to the invoker, so that the processed serial parameter in the request can be used to indicate the invoker to which the request belongs.

According to a second aspect, this application discloses another request processing method, applied to a second device. The request processing method includes: sending a request of an invoker on the second device to a first device, so that the first device sends the request of the invoker on the second device to a server end of a first device interface, and receives response data that corresponds to each request and that is returned by the server end of the first device interface, where the request carries information used to indicate the invoker to which the request belongs, and the first device and the second device are in a connected state; receiving response data that corresponds to each request belonging to the second device and that is returned by the first device, where an invoker to which the response data corresponding to the request belongs is identified by the first device based on information that is carried in the response data corresponding to the request and that is used to indicate the invoker to which the request belongs; and returning, for the response data corresponding to each request, the response data to the invoker to which the response data belongs.

The invoker to which the response data corresponding to the request belongs is identified by the first device based on the information that is carried in the response data corresponding to the request and that is used to indicate the invoker to which the request belongs. Therefore, the second device can receive the response data that corresponds to each request belonging to the second device and that is returned by the first device, and then return, for the response data corresponding to each request, the response data to the invoker to which the response data belongs. In this way, requests of a plurality of invokers on different devices are processed by using the server end of the first device interface.

In a possible implementation, before the sending a request of an invoker on the second device to a first device, the method further includes: receiving a request of an invoker on the first device by using an interface proxy module. The interface proxy module pre-creates a proxy object of a client end of an HIDL interface corresponding to the invoker on the first device and a proxy object of a client end of an HIDL interface corresponding to the invoker on the second device.

In another possible implementation, before the sending a request of an invoker on the second device to a first device, the method further includes:

processing, for a request of each invoker on the second device, a serial parameter in the request based on an identifier of the invoker, so that a processed serial parameter in the request can be used to indicate the invoker to which the request belongs.

In another possible implementation, before the returning, for the response data corresponding to each request, the response data to the invoker to which the response data belongs, the method further includes: restoring, for the response data corresponding to each request belonging to the second device, a processed serial parameter in the response data corresponding to the request.

In another possible implementation, the processing, for a request of each invoker on the second device, a serial parameter in the request based on an identifier of the invoker, so that a processed serial parameter in the request can be used to indicate the invoker to which the request belongs includes: offsetting, for the request of each invoker on the second device based on the identifier of the invoker, the serial parameter in the request by an offset value corresponding to the invoker, so that the processed serial parameter in the request can be used to indicate the invoker to which the request belongs.

In another possible implementation, if the second device has a plurality of invokers, before the returning, for the response data corresponding to each request, the response data to the invoker to which the response data belongs, the method further includes: identifying, for the response data corresponding to each request based on the information that is carried in the response data corresponding to the request and that is used to indicate the invoker to which the request belongs, the invoker to which the response data corresponding to the request belongs.

In another possible implementation, the identifying, for the response data corresponding to each request based on the processed serial parameter in the response data corresponding to the request, the invoker to which the response data corresponding to the request belongs includes: performing, for the response data corresponding to each request, matching between the processed serial parameter in the response data corresponding to the request and a serial parameter value range corresponding to each invoker, and determining a matched invoker as the invoker to which the response data corresponding to the request belongs.

According to a third aspect, this application discloses an electronic device, including: one or more processors, a memory, a display, a wireless communications module, and a mobile communications module. The memory, the display, the wireless communications module, and the mobile communications module are coupled to the one or more processors, the memory is configured to store computer program code, the computer program code includes computer instructions, and when the one or more processors execute the computer instructions, the electronic device performs the request processing method according to any one of the implementations of the first aspect, or the request processing method according to any one of the implementations of the second aspect.

According to a fourth aspect, this application discloses a request processing apparatus. The request processing apparatus includes a processing unit, a storage unit, a display unit, and a transceiver unit, the storage unit is configured to store one or more programs, and the processing unit is configured to execute the one or more programs. The one or more programs include instructions, and the instructions are used to perform the request processing method according to any one of the implementations of the first aspect, or the request processing method according to any one of the implementations of the second aspect.

BRIEF DESCRIPTION OF DRAWINGS

FIG. 3a(1) and FIG. 3a(2) are a system architecture diagram 3 of a request processing system disclosed in this application;

FIG. 4A and FIG. 4B are a schematic flowchart 1 of a request processing method disclosed based on the system shown in FIG. 3a(1) and FIG. 3a(2);

FIG. 5c(1) to FIG. 5c(3) are a schematic diagram of another scenario of returning response data to a device according to this application;

DESCRIPTION OF EMBODIMENTS

Figure 1A:
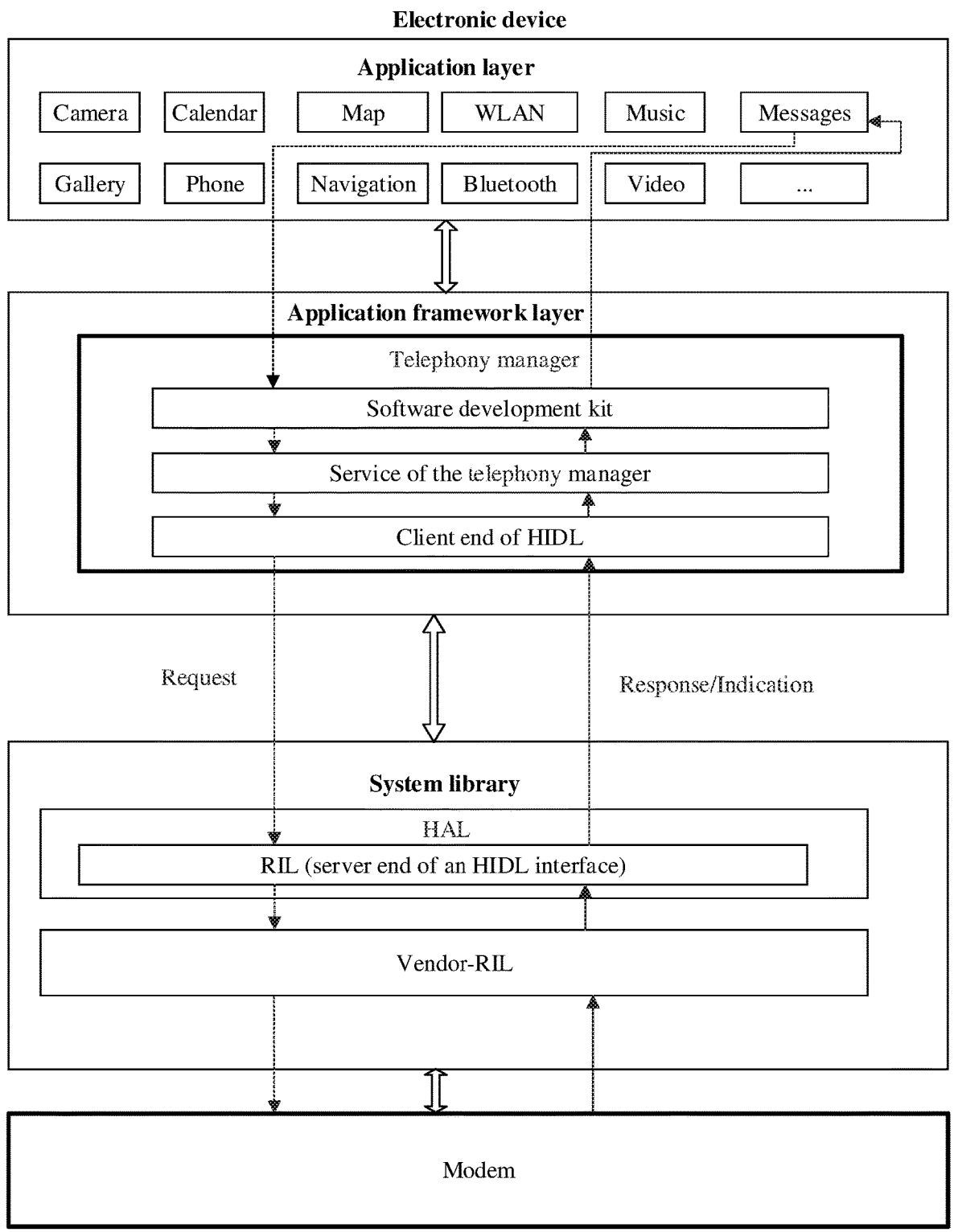
FIG. 1a is a schematic diagram of a software architecture of an electronic device.

The terms "first", "second", "third", and the like in the specification, claims, and accompanying drawings of this application are used to distinguish between different objects, but are not used to limit a specific sequence.

In embodiments of this application, words such as "example" or "for example" are used to represent giving examples, illustrations, or descriptions. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

For clarity and brevity of description of the following embodiments, a solution in which an application side delivers a request to a modem (Modem) for processing is first briefly introduced.

When an electronic device has only one operating system, in the operating system, an invoker on an application side initiates a request and invokes a client end of an HIDL interface corresponding to the invoker, and the request initiated by the invoker is processed at a server end of the HIDL interface. To be specific, the server end of the HIDL interface sends the request to a modem, the modem invokes the server end of the HIDL interface after obtaining response data corresponding to the request through processing, then the server end of the HIDL interface returns the response data corresponding to the request to the client end of the HIDL interface, and the client end of the HIDL interface returns the response data to the corresponding invoker.

The application side refers to a program that runs on an application processor, for example, a program at an application layer or an application framework layer. The invoker is, for example, an application (Application, App) or a telephony manager (telephony).

For example, a telephony manager of the electronic device is an invoker. As shown by a dashed line in FIG. 1a, when an SMS message application at an application layer of the electronic device triggers a request (Request), the request is delivered from the local application layer of the electronic device to the telephony manager (Telephony) at an application framework layer. The request invokes an Android open source project (Android Open Source Project, AOSP) software development kit (Software Development Kit, SDK) application programming interface (Application Programming Interface, API) in the telephony manager. Then, the AOSP SDK API invokes a service (Telephony Service) interface of the telephony manager. Then, the telephony service invokes a client end of an HIDL interface. Then, the client end of the HIDL interface invokes a server end of the HIDL interface in a local system library. Then, the server end of the HIDL interface sends the request to a vendor radio interface layer (Vendor-RIL), and the Vendor-RIL sends the request to a local modem (Modem) for processing. The server end of the HIDL interface is on an RIL module at an HAL layer.

As shown by a solid line in FIG. 1a, after processing, the local modem obtains response data (Response) corresponding to the request, then the modem reports the response to the client end of the HIDL interface in the telephony manager through the Vendor-RIL and the server end of the HIDL interface, and then the response is sent to the SMS message application through the telephony service and the software development kit in the telephony manager. The local modem may also actively report an indication (Indication) to the telephony manager by invoking the server end of the HIDL interface, and then the telephony manager continues to report the indication to the SMS message application. A reporting process of the indication may be the same as that of the response, and details are not described herein. There may also be a request of another application other than the SMS message application shown in FIG. 1a.

It can be learned from the foregoing content that a server end of one HIDL interface in the electronic device can only fixedly receive a request delivered by a client end of one HIDL interface, and return a corresponding response to the client end. In the electronic device, to ensure that response data that is corresponding to a request and that is returned by a server end of an HIDL interface can one-to-one correspond to the request delivered by a client end of the HIDL interface, so as to ensure that the response data corresponding to the request can be returned to an invoker corresponding to the client end of the HIDL interface, a server end of each HIDL interface is fixedly registered with a client end of one HIDL interface.

This application provides an embodiment. A plurality of server ends are created at an HAL layer of an electronic device, so that a plurality of devices share a cellular capability, or different operating systems of a same device can use a cellular capability. For example, as shown in FIG. 1c, a server end needs to be independently established for each client end at the HAL layer. Different client ends may be different operating systems located on a same device, or may be different devices.

Figure 1B:
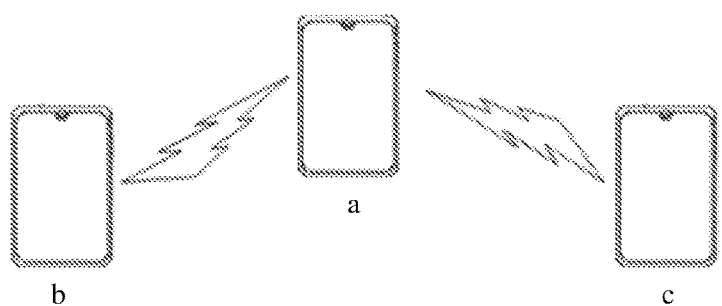
FIG. 1b is a diagram 1 of a cellular communication capability sharing scenario.
Figure 1C:
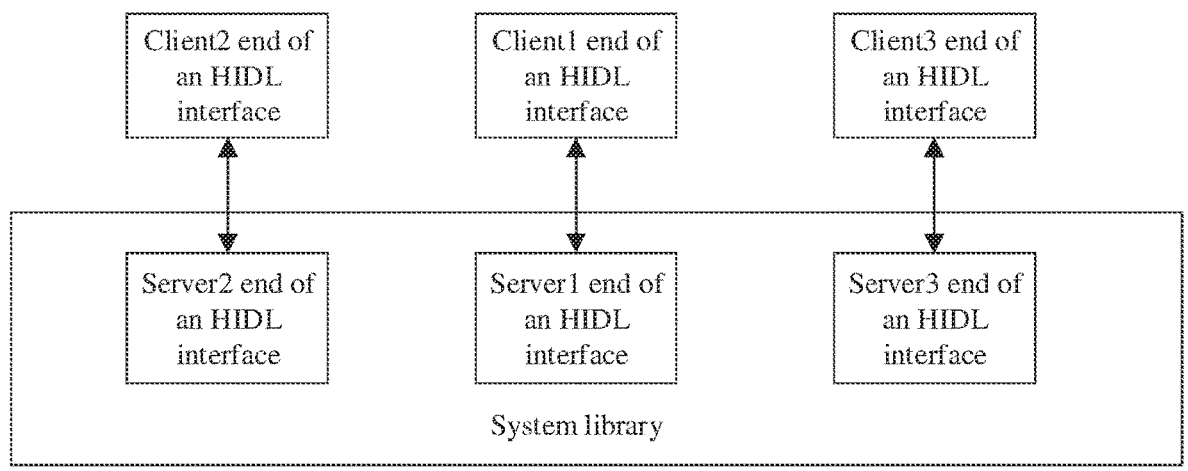
FIG. 1c is a schematic diagram of an HIDL interface connection relationship inside a mobile phone a in the scenario in FIG. 1b.

For example, as shown in FIG. 1b, a mobile phone a is a first device, and mobile phones b and c are second devices. When the mobile phone b and the mobile phone c want to share a cellular capability of the mobile phone a, the mobile phone a needs to separately establish server ends at the HAL layer for the mobile phone b and the mobile phone c.

It can be learned from the foregoing technical solutions that, to share the cellular capability, the first device separately establishes a server end for each second device or each operating system. However, a quantity of server ends started in the first device is fixedly configured in code, and cannot be dynamically adjusted with an increase or a decrease in a quantity of shared devices. As a result, the code needs to be continuously adjusted at the HAL layer to support different quantities of client ends. This is inconvenient for use.

The first device mentioned in this application is an electronic device that provides a modem, and the second device mentioned in this application is an electronic device that uses the modem of the first device.

This application provides another embodiment. A request delivered by an invoker carries information used to describe the invoker to which the request belongs, to identify an invoker to which each request belongs, so that requests delivered by a plurality of invokers are processed by invoking a server end of a same HIDL interface by using an interface proxy module, and response data corresponding to each request can be returned to a corresponding invoker.

To clearly describe the following embodiments of a request processing process provided in this application, a brief introduction of a technology related to embodiments of this application is first provided.

A proxy mode is a design mode that provides an additional access manner for a target object by creating a proxy object of the target object. The target object is an interface, for example, may be a client end of an HIDL interface, or may be a client end of a radio HIDL interface in HIDL interfaces. The target object is accessed through the proxy object, so that an additional function operation can be provided by using the proxy object without modifying the original target object, to extend a function of the original target object.

The request mentioned in embodiments of this application may be a request delivered by an invoker on an application side to a modem, for example, may be a request in a cellular communication service. For example, all services or capabilities related to cellular communication may be referred to as cellular communication services. For example, a call, an SMS message, a SIM card change, and call forwarding may all be referred to as cellular communication services.

Figure 1D:
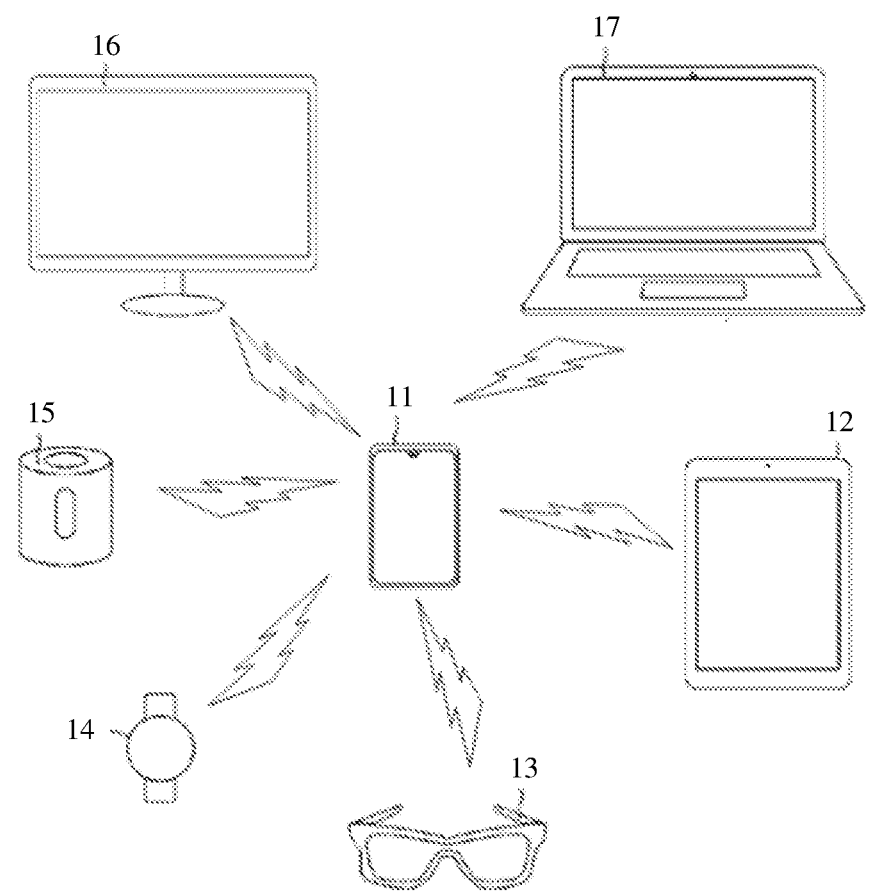
FIG. 1d is a diagram 2 of a cellular communication capability sharing scenario.

Embodiments provided in this application may be applicable to a scenario in which a plurality of devices share a cellular capability. For example, as shown in FIG. 1b, the mobile phone b and the mobile phone c may share a cellular capability of the mobile phone a by using the method provided in embodiments of this application. For another example, as shown in FIG. 1d, the first device may be a mobile phone 11 in FIG. 1d. The second device may be a tablet 12, smart glasses 13, a watch 14, a sound box 15, a smart screen 16, or a notebook computer 17 in FIG. 1d. Embodiments provided in this application may enable second devices to share a cellular capability or a modem of the first device.

A request processing method provided in embodiments of this application may be further applicable to a scenario in which a single operating system in the first device uses one modem. For example, in a same operating system, a plurality of independent communication services or applications may share one modem.

In embodiments of this application, requesting party information may be added to requests to distinguish between invokers of the requests. The requesting party information may be a serial (Serial) parameter, or may be a user-defined parameter or a newly added field.

Figure 2A:
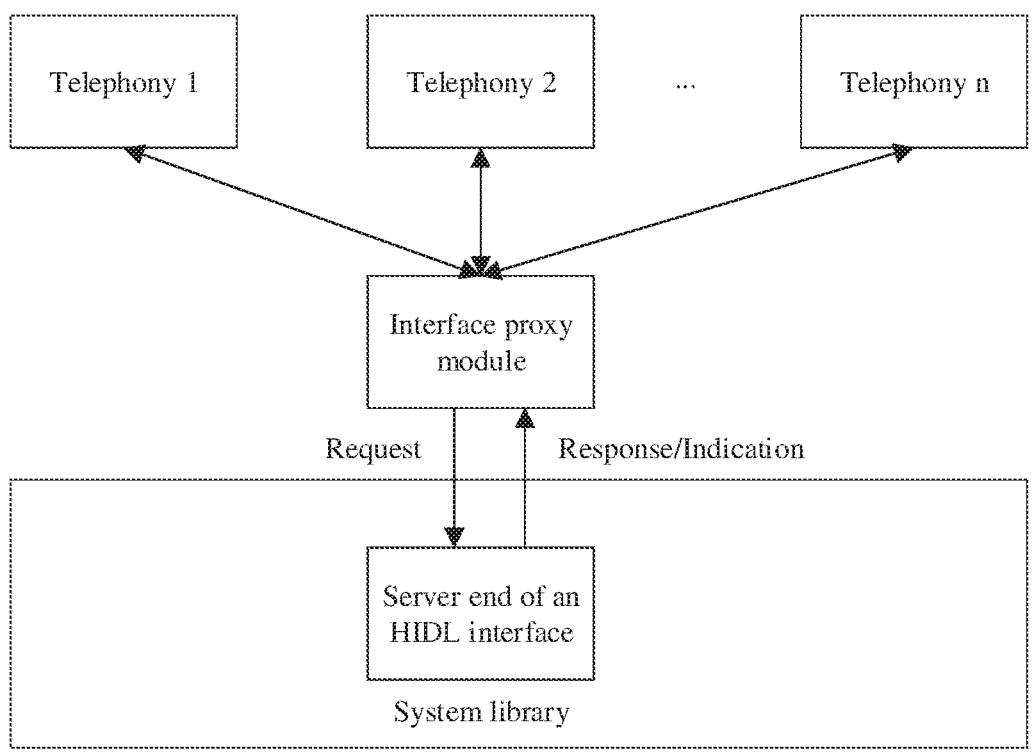
FIG. 2a is an architecture diagram 1 of a request processing system disclosed in this application.

In some embodiments, the second device or the first device may distinguish, by using serial parameters, between invokers to which requests belong. For example, as shown in FIG. 2a, only one interface proxy module may be added to the first device, and the interface proxy module may be a proxy for client ends of a plurality of HIDL interfaces. Specifically, the interface proxy module receives requests delivered by n invokers: telephony 1, telephony 2, . . . , and telephony n. For related content of receiving a request by the interface proxy module, refer to related descriptions in step S3013 in FIG. 3b, step S3022 and step S3023 in FIG. 3c, step S407 and step S408 in FIG. 4A and FIG. 4B, and step S601 in FIG. 6a. For distinguishing between invokers by using serial parameters, refer to the following related descriptions in step S3032 to step S3034 in FIG. 3d and step S413 to step S418 in FIG. 4A and FIG. 4B.

Figure 2B:
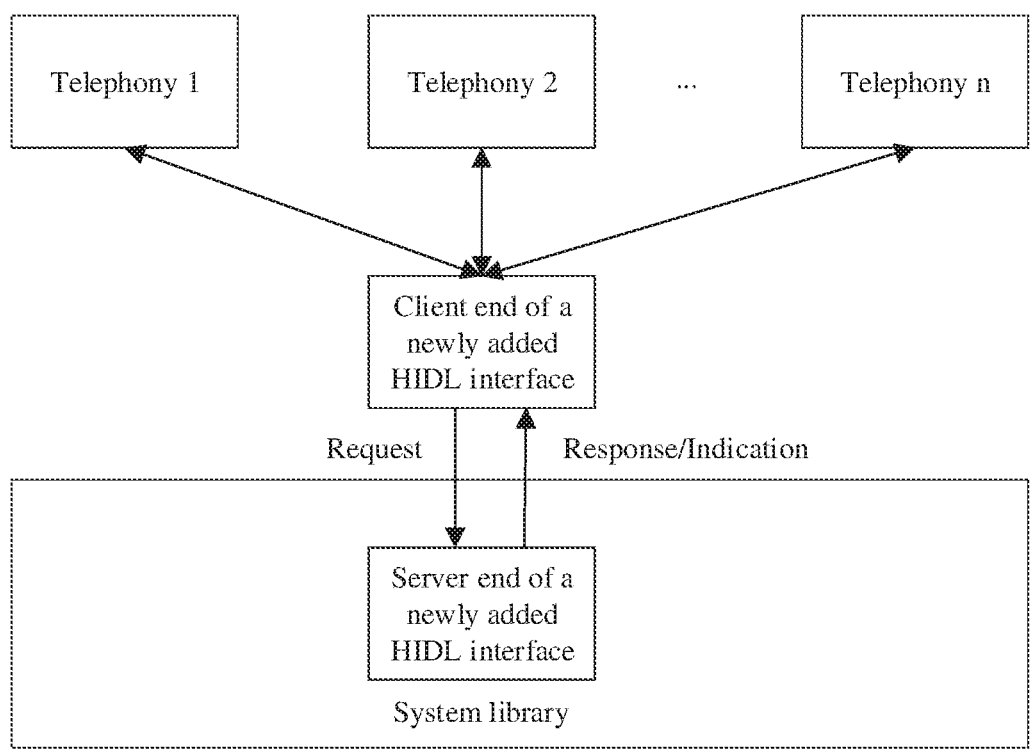
FIG. 2b is an architecture diagram 2 of a request processing system disclosed in this application.

In some other embodiments, the electronic device may alternatively determine an invoker by using a newly added field or a user-defined parameter. For example, as shown in FIG. 2b, a request sent by an invoker, for example, a telephony, may carry a newly added field or parameter, and this field or parameter may be used to identify an identity of the invoker. In this case, when receiving the request, a client end of the first device may identify the identity of the invoker by using the newly added field or parameter. Specifically, for a process in which the client end of the HIDL interface receives the request, refer to related descriptions in step S601 in FIG. 6a.

The invokers shown in FIG. 2a and FIG. 2b may be in a same operating system, or may be distributed in different operating systems. The n invokers may be all in the first device, or may be distributed in a plurality of different devices (that is, distributed in a plurality of second devices and the first device). In addition to the telephony shown in FIG. 2a, the invoker may alternatively be another type of invoker such as an IP multimedia subsystem (IP Multimedia Subsystem, IMS) application. In addition, a type of an interface is not limited in embodiments of this application. In addition to the HIDL interface, there may be a first device interface of another type.

In some embodiments, the second device in embodiments of this application may be an electronic device such as a mobile phone, a tablet computer, a desktop computer, a laptop computer, a laptop computer, an ultra-mobile personal computer (Ultra-mobile Personal Computer, UMPC), a handheld computer, a netbook, a personal digital assistant (Personal Digital Assistant, PDA), a wearable electronic device, or a smartwatch. The first device is an electronic device that has a cellular communication capability, such as a mobile phone or a smart call watch. A specific form of the electronic device is not specifically limited in this application. It should be noted that the second device in embodiments of this application is a device that uses a cellular communication capability of the first device, and the first device is a device that has a cellular communication capability.

Figure 2C:
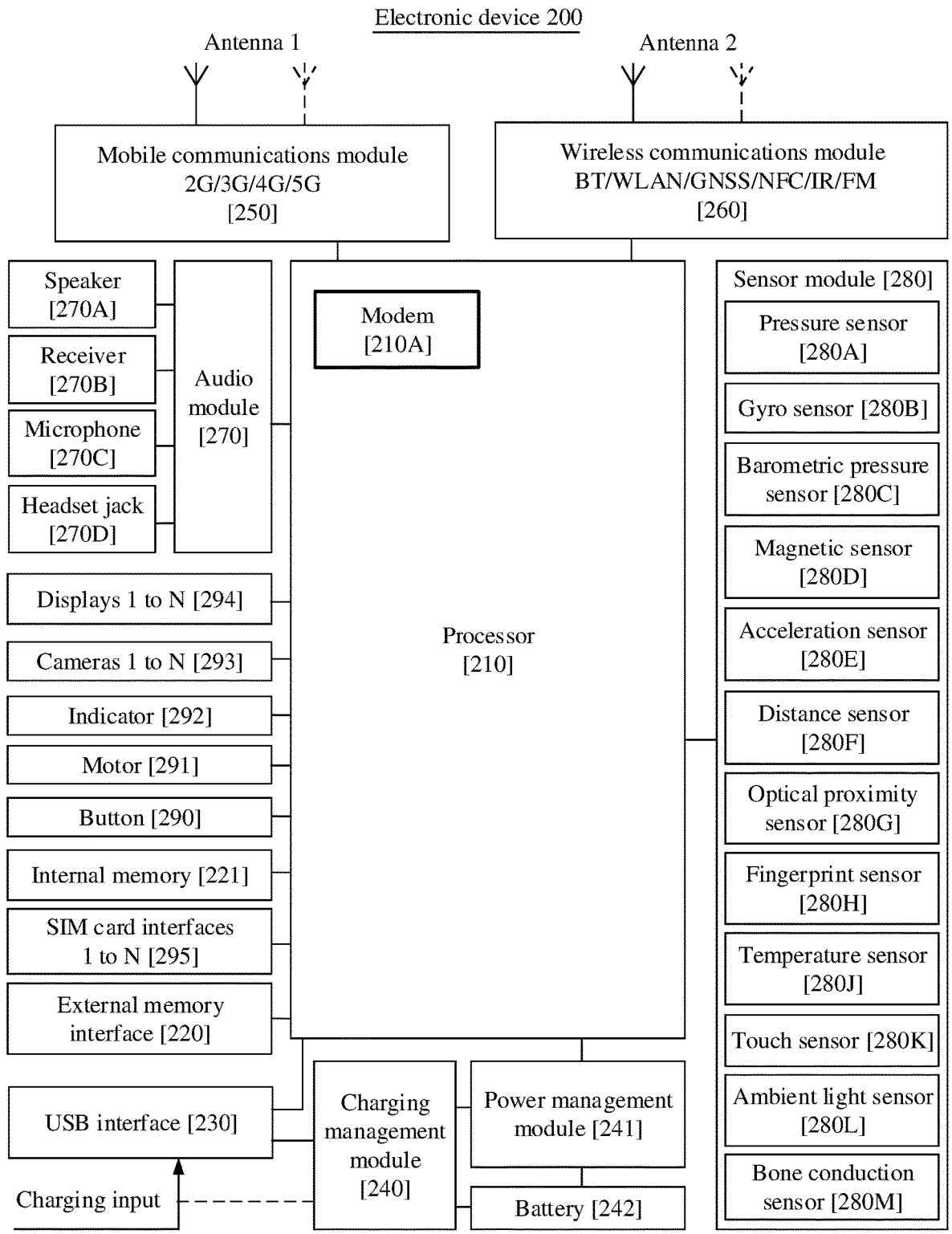
FIG. 2c is an example diagram 1 of composition of an electronic device disclosed in this application.

In embodiments of this application, structures of the second device and the first device may be shown in FIG. 2c, and the second device and the first device are collectively referred to as electronic devices 200 in FIG. 2c for description. The electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (subscriber identification module, SIM) card interface 295, and the like. The sensor module 280 may include a pressure sensor 280A, a gyro sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment does not constitute a specific limitation on the electronic device 200. In some other embodiments, the electronic device 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. For another example, in embodiments of this application, the processor 210 may perform the request processing method in any one of embodiments of this application.

The controller may be a nerve center and a command center of the electronic device 200. The controller may generate an operation control signal based on instruction operation code and a time sequence signal, to complete control of instruction fetching and instruction execution.

A memory may further be disposed in the processor 210, to store instructions and data.

The charging management module 240 is configured to receive charging input from a charger. The charger may be a wireless charger, or may be a wired charger. In some embodiments, when charging the battery 242, the charging management module 240 may further supply power to the electronic device through the power management module 241.

The power management module 241 is configured to connect the battery 242, the charging management module 240, and the processor 210. The power management module 241 receives input of the battery 242 and/or the charging management module 240, and supplies power to the processor 210, the internal memory 221, the display 294, the camera 293, the wireless communications module 260, and the like.

A wireless communication function of the electronic device 200 may be implemented by using the antenna 1, the antenna 2, the mobile communications module 250, the wireless communications module 260, the modem 210A, the baseband processor, and the like.

The antenna 1 and the antenna 2 are configured to transmit and receive electromagnetic wave signals. Each antenna in the electronic device 200 may be configured to cover one or more communication bands. Different antennas may be multiplexed to improve antenna utilization.

The mobile communications module 250 may provide a solution for wireless communication, including 2G/3G/4G/5G and the like, that is applied to the electronic device 200.

The modem 210A may include a modulator and a demodulator. The modulator is configured to adjust a to-be-sent low-frequency baseband signal to a medium/high-frequency signal. The demodulator is configured to demodulate a received electromagnetic wave signal into a low-frequency baseband signal. In some embodiments, the modem 210A may be an independent device. In some other embodiments, the modem 210A may be independent of the processor 210 and disposed in a same device as the mobile communications module 250 or another function module. For example, in some embodiments of this application, when the electronic device 200 is a second device shown in FIG. 3a(1) and FIG. 3a(2), the electronic device 200 may not have the modem 210A. When the electronic device 200 is the first device mentioned in the foregoing embodiments of this application, the electronic device 200 needs to have the modem 210A, to provide a cellular communication capability for the second device. For example, in this embodiment of this application, when the electronic device 200 is the first device shown in FIG. 3a(1) and FIG. 3a(2), for a specific execution process and principle of the modem 210A, refer to the following related descriptions of the modem in the first device in any request processing method and request processing system in embodiments of this application. Details are not described herein.

The wireless communications module 260 may provide a solution for wireless communication that is applied to the electronic device 200 and that includes a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like.

The electronic device 200 implements a display function by using the GPU, the display 294, the application processor, and the like. The GPU is a microprocessor for image processing, and is connected to the display 294 and the application processor.

The display 294 is configured to display an image, a video, and the like. A series of graphical user interfaces (graphical user interface, GUI) may be displayed on the display 294 of the electronic device 200.

The electronic device 200 may implement a photographing function by using the ISP, the camera 293, the video codec, the GPU, the display 294, the application processor, and the like.

The camera 293 is configured to capture a still image or a video.

The external memory interface 220 may be configured to connect to an external memory card, such as a micro SD card, to extend a storage capability of the electronic device 200.

The internal memory 221 may be configured to store computer executable program code, where the executable program code includes instructions. The processor 210 perform various function applications and data processing of the electronic device 200 by running the instructions stored in the internal memory 221. The processor 210 performs various function applications and data processing of the electronic device 200 by running the instructions stored in the internal memory 221 and/or instructions stored in the memory disposed in the processor.

The electronic device 200 may implement an audio function, such as music playing and recording, by using the audio module 270, the speaker 270A, the receiver 270B, the microphone 270C, the headset jack 270D, the application processor, and the like. The electronic device 200 may further include the pressure sensor 280A, the barometric pressure sensor 280C, the gyro sensor 280B, the magnetic sensor 280D, the acceleration sensor 280E, the distance sensor 280F, the optical proximity sensor 280G, the ambient light sensor 280L, the fingerprint sensor 280H, the temperature sensor 280J, the touch sensor 280K, the bone conduction sensor 280M, the button 290, the motor 291, the indicator 292, and the like.

The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, and N is a positive integer greater than 1. The SIM card interface 295 can support a nano-SIM card, a micro-SIM card, a SIM card, and the like. A plurality of cards may be simultaneously inserted into a same SIM card interface 295. The SIM card interface 295 may also be compatible with an external memory card. The electronic device 200 interacts with a network by using a SIM card, to implement functions such as conversation and data communication.

In addition, an operating system runs on the foregoing components, for example, a Harmony operating system, an iOS operating system, an Android operating system, or a Windows operating system. An application may be installed and run on the operating system. In some other embodiments, there may be a plurality of operating systems running in the electronic device.

FIG. 3a(1) and FIG. 3a(2) show a request processing system 300 according to an embodiment of this application. The request processing system 300 is configured to process requests delivered by the second device and the first device. In some other embodiments, operating systems in the second device and the first device in the request processing system 300 may be located in a same electronic device, and the following process in which the request processing system 300 processes requests delivered by the second device and the first device may also be applicable to a process of processing requests delivered by two operating systems in a same electronic device.

In some embodiments, a hierarchical architecture of the second device in the request processing system 300 disclosed in this embodiment of this application divides software into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages. As shown in FIG. 3a(1) and FIG. 3a(2), the application packages may include applications such as Camera, Gallery, Calendar, Phone, Map, Navigation, WLAN, Bluetooth, Music, Video, and Messages.

The application framework layer provides an application programming interface (application programming interface, API) and a programming framework for applications at the application layer. The application framework layer includes some predefined functions. As shown in FIG. 3a(1) and FIG. 3a(2), the application framework layer may include a window manager, a content provider, a view system, a distributed cellular communications module 3011, a telephony manager 3012, a distributed bus 3013, a resource manager, a notification manager, and the like.

The window manager is configured to manage window programs. The window manager may obtain a display size, determine whether there is a status bar, lock a screen, take a screenshot, and the like.

The content provider is configured to store and obtain data and make the data accessible to the application. The data may include videos, images, audio, calls that are made and received, browsing history and bookmarks, a phone book, and the like.

The view system includes visual controls, such as a text display control and a picture display control. The view system may be configured to construct an application. A display interface may include one or more views. For example, a display interface including an SMS notification icon may include a text display view and a picture display view.

The telephony manager 3012 is configured to provide a cellular communication function of the second device, for example, call status management (including accepting and declining). For a function of the telephony manager 3012 in this embodiment of this application, refer to the following descriptions of the telephony manager 3012 in the request processing system 300.

The distributed cellular communications module 3011 is configured to forward a request of a cellular communication service of the telephony manager 3012 to a distributed cellular communications module 3022 of the first device. For a function of the distributed cellular communications module 3011 of the second device in this embodiment of this application, refer to the following descriptions of the distributed cellular communications module 3011 of the second device in the request processing system 300. For example, in some embodiments, the distributed cellular communications module 3011 of the second device includes an interface proxy module 3011A. Based on the foregoing mentioned proxy mode technology, the interface proxy module 3011A creates a proxy object oriented to a client end of an HIDL interface in the second device, and the proxy object oriented to the client end of the HIDL interface in the second device may be configured to receive a request delivered by an invoker on the second device, and forward the request to the first device. The proxy object oriented to the client end of the HIDL interface in the second device may be understood as a proxy object of a request interface, that is, requests delivered by invokers on the second device are all received by the proxy object of the request interface. In some embodiments, the request that is delivered by the invoker on the second device and that is received by the distributed cellular communications module 3011 of the second device further includes an identifier of the invoker that delivers the request. The distributed cellular communications module 3011 of the second device performs offset processing on a serial (serial) parameter in the request based on the identifier of the invoker, and an offset-processed serial parameter in the request can indicate the invoker corresponding to the request.

For a specific execution process and principle of the distributed cellular communications module 3011 of the second device, refer to related descriptions in the following request processing system and request processing method mentioned in embodiments of this application. Details are not described herein.

The distributed bus 3013 is configured to establish a connection channel between the distributed cellular communications module 3011 of the second device and the distributed cellular communications module 3022 of the first device, to connect the distributed cellular communications module 3011 of the second device and the distributed cellular communications module 3022 of the first device. In some embodiments, the distributed bus 3013 may be responsible for device discovery, self-connection, authentication management, and the like under a same account in a short distance, a local area network, or a remote field. The distributed bus may also be responsible for scheduling management, quality of service experience evaluation, and the like of different channels. This is transparent to the application layer. The distributed bus may also be responsible for maintaining a channel and providing a low-power standby mechanism. The distributed bus may also be responsible for forwarding/responding to control plane signaling (for example, a request and response data corresponding to the request in the following request processing method and request processing system in embodiments of this application) and encryption encapsulation.

The resource manager provides various resources for the application, such as a localized string, an icon, a picture, a layout file, and a video file.

The core library includes two parts: a function that needs to be invoked by using the Java language, and a core library of Android.

The application layer and the application framework layer run in the virtual machine. The virtual machine executes a binary file of a Java file at the application layer and the application framework layer. The virtual machine is configured to perform functions such as object lifecycle management, stack management, thread management, security and abnormity management, and garbage collection.

The system library may include a plurality of function modules, for example, a surface manager (surface manager), a media library (Media Libraries), a three-dimensional graphics processing library (for example, OpenGL ES), a 2D graphics engine (for example, SGL), a hardware abstraction layer (Hardware Abstraction Layer, HAL), and a radio interface layer (Radio Interface Layer, RIL) module at the HAL. The RIL module is further provided with a server end of an HIDL interface.

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as MPEG-4, H.264, H.265, H.266, VP9, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Still referring to FIG. 3a(1) and FIG. 3a(2), for a software hierarchical architecture of the first device, refer to the software hierarchical architecture of the second device. Details are not described herein. The first device further includes a modem 3021, and the modem 3021 is configured to process a received request to obtain response data corresponding to the request, and then send the response data corresponding to the request to the distributed cellular communications module 3022.

In some embodiments, referring to the distributed cellular communications module 3011 of the second device, the first device may also be provided with the distributed cellular communications module 3022 at an application framework layer of the first device. The distributed communications module 3022 may also be provided with an interface proxy module 3022A. For a manner of disposing the proxy module, refer to the manner of disposing the interface proxy module 3011A in the second device. Details are not described herein. The interface proxy module 3022A may create a proxy object oriented to a client end of an HIDL interface in the first device. The proxy object oriented to the client end of the HIDL interface in the first device is configured to receive response data that is corresponding to all requests and that is sent by a server end of the HIDL interface in the first device. In addition, the distributed cellular communications module 3022 may also receive a request of the second device and a request delivered by an invoker on the first device. It may be understood that the request of the second device received by the distributed cellular communications module 3022 may be a request processed by the interface proxy module of the second device, or may be an unprocessed request.

In some embodiments, when a plurality of invokers exist on the first device, the distributed cellular communications module 3022 may identify an invoker by using requesting party information. For a specific manner, refer to the manner shown in FIG. 2a and FIG. 2b.

A principle and an execution process of a distributed bus 3024 of the first device are consistent with those of the distributed bus 3013 of the second device. Details are not described herein.

Figure 3B:
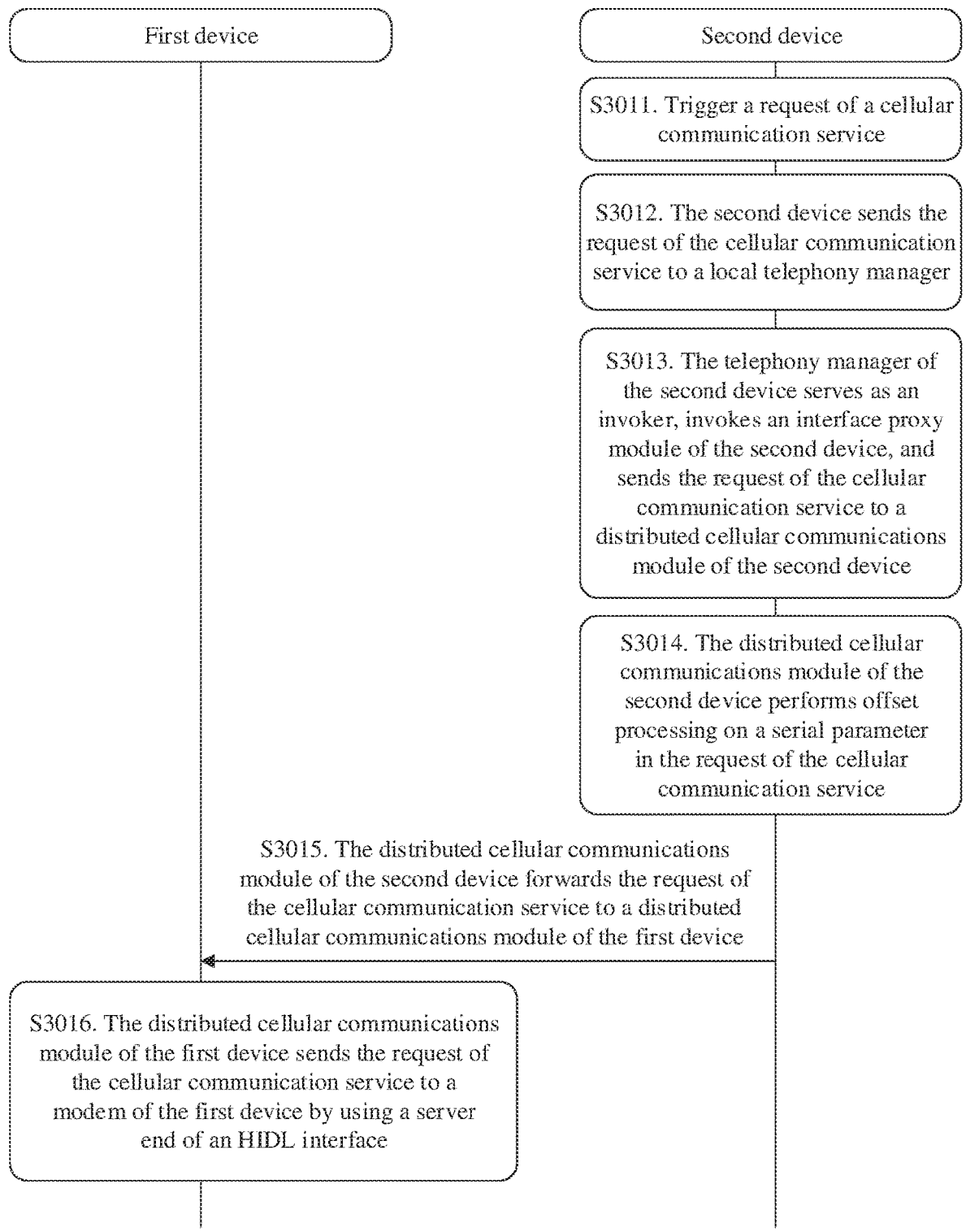
FIG. 3b is a schematic flowchart in which an invoker on a second device delivers a request according to this application.

In some embodiments, when the first device has shared a cellular communication capability of the first device (that is, a modem of the first device) with the second device, as shown in FIG. 3b, a process of processing the request of the cellular communication service of the second device in the system in FIG. 3a(1) and FIG. 3a(2) may be that the second device performs step S3011 to trigger the request of the cellular communication service. Then, step S3012 is performed: The second device sends the request of the cellular communication service to a local telephony manager. In step S3013, the telephony manager of the second device serves as an invoker, invokes the interface proxy module of the second device, and sends the request of the cellular communication service to the distributed cellular communications module of the second device. The interface proxy module of the second device pre-creates a proxy object of a request interface, which is a proxy for an interface invoked by the client end of the HIDL interface to the server end of the HIDL interface, or may be considered as a request interface of the client end. It should be noted that delivery of a request by the client end of the HIDL interface and receiving of response data corresponding to the request are processed asynchronously, that is, are not processed by a same interface. In step S3014, the distributed cellular communications module of the second device performs offset processing on a serial parameter in the request of the cellular communication service, where an offset-processed serial parameter in the request can indicate the invoker corresponding to the request. For an execution process and a principle of step S3011 to step S3014, refer to related content in step S401 to step S406 in FIG. 4A and FIG. 4B and step S601 in FIG. 6a. In step S3015, the distributed cellular communications module of the second device forwards the request of the cellular communication service to the distributed cellular communications module of the first device. For an execution process and a principle of step S3015, refer to related content in step S407 in FIG. 4A and FIG. 4B. The first device performs step S3016. The distributed cellular communications module of the first device sends the request of the cellular communication service to the modem of the first device by using the server end of the HIDL interface, and the modem of the first device processes the request of the cellular communication service to obtain response data corresponding to the request of the cellular communication service. The processed request of the cellular communication service can be used to identify the invoker to which the request belongs. For an execution process and a principle of step S3016, refer to relate content in step S409 to step S411 in FIG. 4A and FIG. 4B, step S602 and step S603 in FIG. 6a, and the following Table 1. A transmission path of the request of the cellular communication service of the second device in the system in FIG. 3a(1) and FIG. 3a(2) may be shown by a solid-line arrow in FIG. 3a(1) and FIG. 3a(2).

In some embodiments, a request delivered by the first device and the second device may be another request other than the request of the cellular communication service. A format, content, or the like of the request is not limited in this embodiment of this application. In some other embodiments, an invoker on the first device or the second device may be another invoker other than the telephony manager. For example, an IP multimedia subsystem (IP Multimedia Subsystem, IMS) application may also serve as an invoker to invoke the interface proxy module 3011A. For a transmission process of a request delivered by the IP multimedia subsystem in the request processing system 300, refer to the transmission process of the request delivered by the telephony manager 3012 in the request processing system 300. Details are not described herein. There are many manners in which an upper-layer application (that is, the application layer and the application framework layer) invokes a distributed cellular communications module. This is not limited in this embodiment of this application.

Figure 3C:
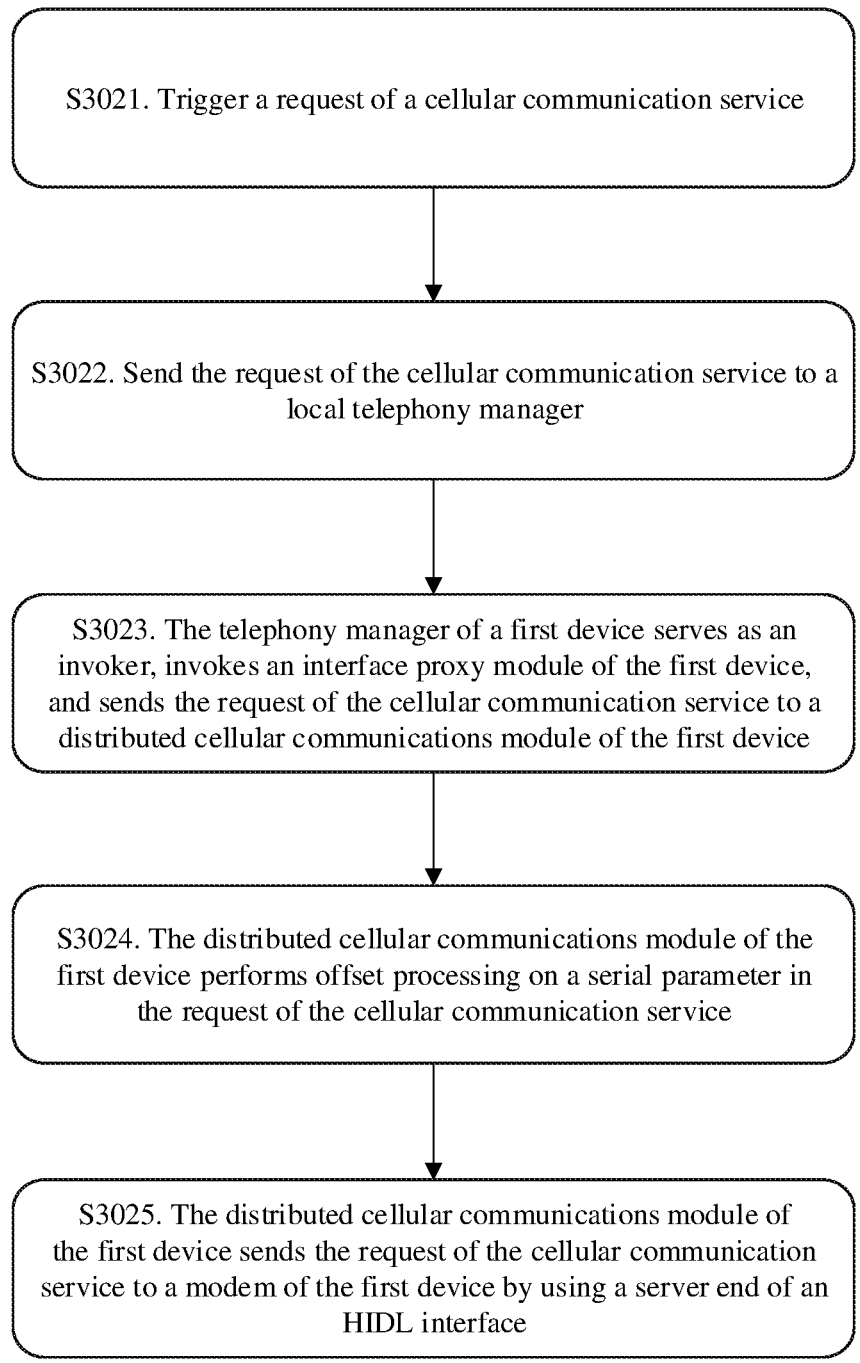
FIG. 3c is a schematic flowchart in which an invoker on a first device delivers a request according to this application.

In some embodiments, as shown in FIG. 3c, a process of processing the request of the cellular communication service of the first device in the system shown in FIG. 3a(1) and FIG. 3a(2) may be that the first device performs step S3021 to trigger the request of the cellular communication service. Then, step S3022 is performed: The first device sends the request of the cellular communication service to a local telephony manager. In step S3023, the telephony manager of the first device serves as an invoker, invokes the interface proxy module of the first device, and sends the request of the cellular communication service to the distributed cellular communications module of the first device. The interface proxy module of the first device pre-creates a proxy object of a request interface, which is a proxy for an interface invoked by the client end of the HIDL interface of the first device to the server end of the HIDL interface, or may be considered as a request interface of the client end of the first device. For an execution process and a principle of step S3021 to step S3023, refer to related content in step S404 and step S408 shown in FIG. 4A and FIG. 4B. In step S3024, the distributed cellular communications module of the first device performs offset processing on a serial parameter in the request of the cellular communication service, where an offset-processed serial parameter in the request can indicate the invoker corresponding to the request. For an execution process and a principle of step S3024, refer to step S409 in FIG. 4A and FIG. 4B. In another embodiment, the distributed cellular communications module of the first device may alternatively identify, by using a user-defined parameter or field in the request, the invoker to which the request belongs. For details, refer to related content in step S601 in FIG. 6a. The first device performs step S3025. The distributed cellular communications module of the first device sends the request of the cellular communication service to the modem of the first device by using the server end of the HIDL interface, and the modem of the first device processes the request of the cellular communication service to obtain response data corresponding to the request of the cellular communication service. For an execution process and a principle of step S3025, refer to relate content in step S410 and step S411 in FIG. 4A and FIG. 4B, and step S602 and step S603 in FIG. 6a.

For example, a transmission process of the request of the cellular communication service delivered by the first device in the request processing system 300 is shown by a solid-line arrow in FIG. 3a(1) and FIG. 3a(2). For details, refer to an invocation process of the second device. A difference lies in that the request of the cellular communication service delivered by the first device does not need to be sent to the distributed cellular communications module 3022 by using the distributed bus.

Figure 3D:
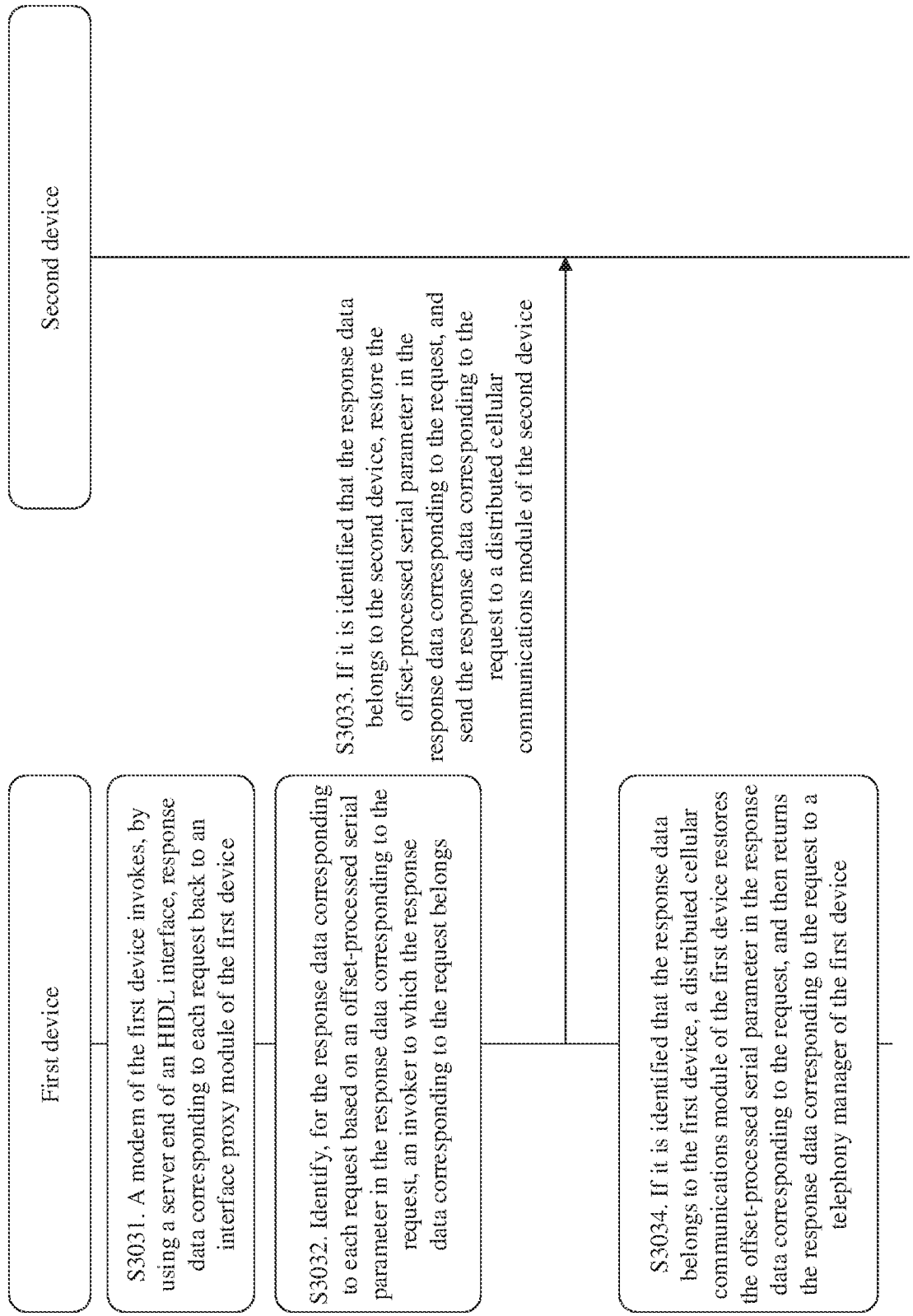
FIG. 3d is a schematic flowchart of returning response data to an invoker according to this application.

In some embodiments, as shown in FIG. 3d, after the modem of the first device obtains, through processing, response data corresponding to the request of the cellular communication service of the second device and response data corresponding to the request of the cellular communication service of the first device, a process of processing the response data corresponding to the request in the system in FIG. 3a(1) and FIG. 3a(2) may be as follows: In step S3031, the modem of the first device invokes, by using the server end of the HIDL interface, response data corresponding to each request back to the interface proxy module of the first device. The interface proxy module of the first device pre-creates a proxy object of a response interface, which is a proxy for an interface invoked by the server end of the HIDL interface to the client end of the HIDL interface, or may be considered as a response interface of the client end.

Figure 4A:
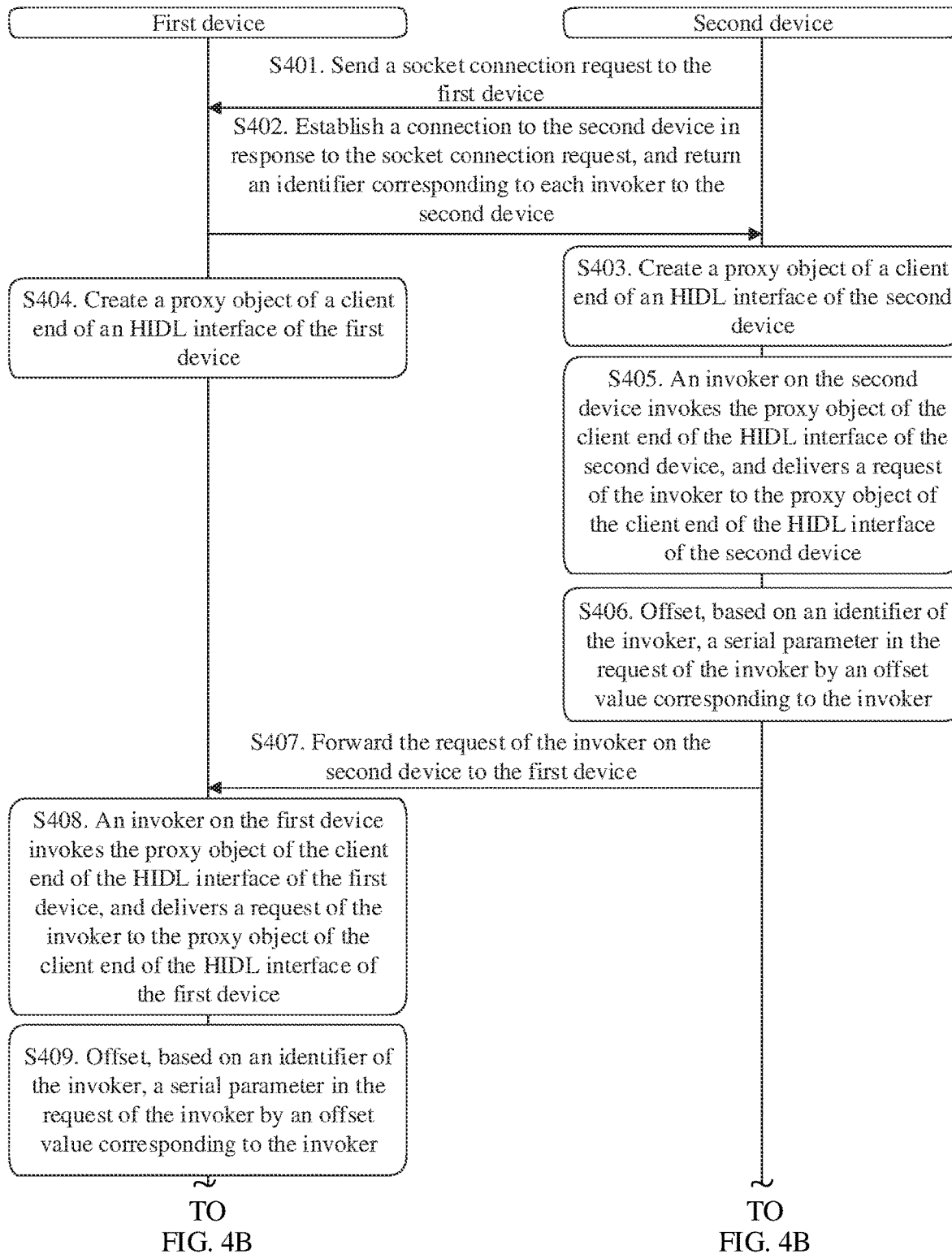
Figure 6A:
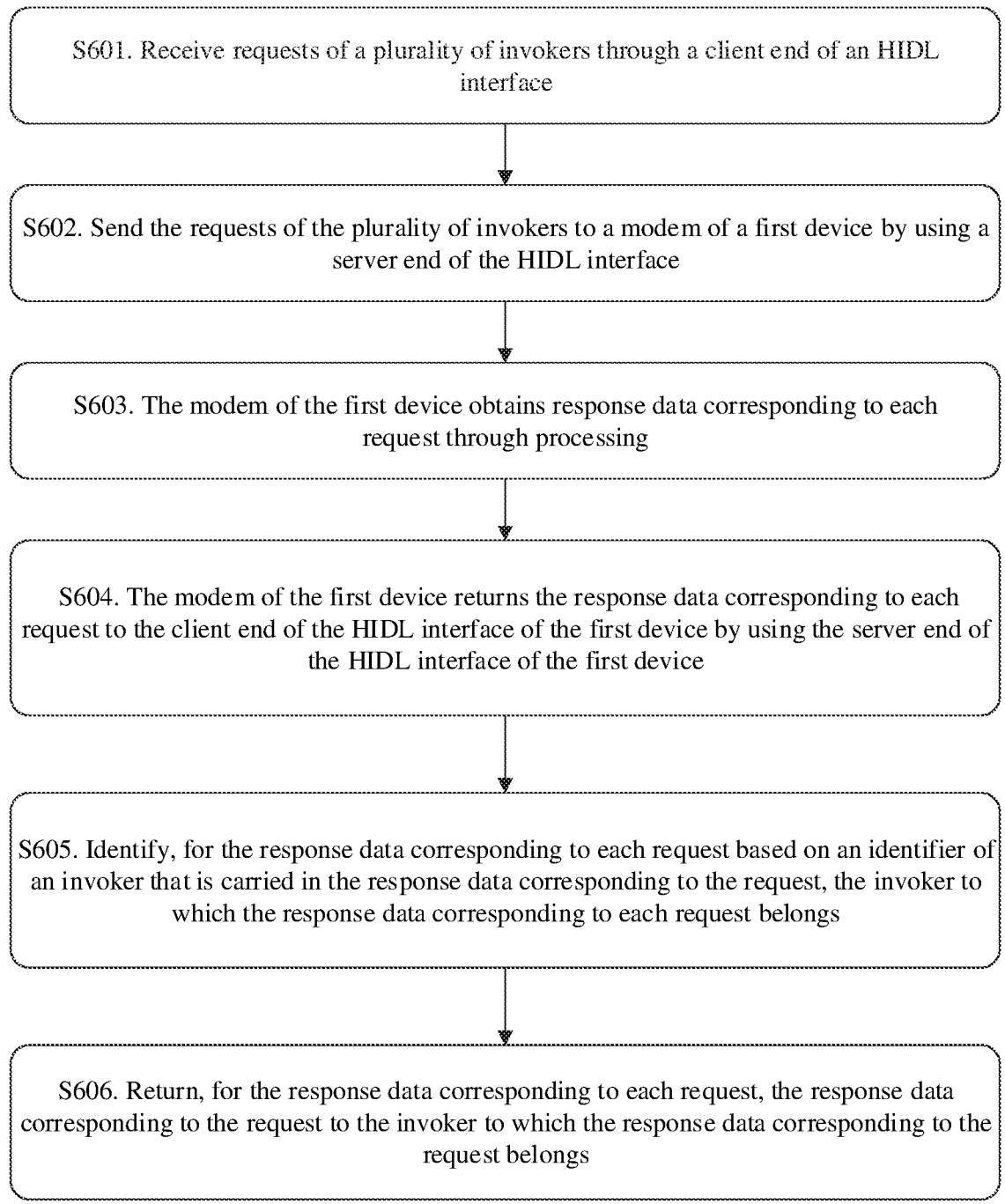
FIG. 6a is a schematic flowchart 2 of a request processing method disclosed in this application.

For an execution process and a principle of step S3031, refer to relate content in step S412 in FIG. 4A and FIG. 4B, and step S604 in FIG. 6a. In step S3032, for response data corresponding to each request, the distributed cellular communications module of the first device identifies, based on an offset-processed serial parameter in the response data corresponding to the request, an invoker to which the response data corresponding to the request belongs. For an execution process and a principle of step S3032, refer to related content in step S605 in FIG. 6a, S413 in FIG. 4A and FIG. 4B, and Table 1. If it is identified that the invoker to which the response data corresponding to the request belongs pertains to the second device, step S3033 is performed; or if it is identified that the invoker to which the response data corresponding to the request belongs is located in the first device, step S3034 is performed. In step S3033, the distributed cellular communications module of the first device performs restoration processing on the offset-processed serial parameter in the response data corresponding to the request, and then sends the response data corresponding to the request to the distributed cellular communications module of the second device, and the distributed cellular communications module of the second device returns the response data corresponding to the request to the telephony manager of the second device. In step S3034, the distributed cellular communications module of the first device performs restoration processing on the offset-processed serial parameter in the response data corresponding to the request, and then returns the response data corresponding to the request to the telephony manager of the first device. For an execution process and a principle of step S3033 and step S3034, refer to related content in step S414 to step S418 in FIG. 4A and FIG. 4B and step S606 in FIG. 6a.

For example, a transmission path of the response data corresponding to the request of the second device and the request of the first device may be shown by a dashed-line arrow in FIG. 3a(1) and FIG. 3a(2). In step S3031, the modem 3021 of the first device invokes, by using the server end of the HIDL interface, response data corresponding to each request back to the interface proxy module 3022A of the first device. In step S3032, for response data corresponding to each request, the distributed cellular communications module 3022 of the first device identifies, based on an offset-processed serial parameter in the response data corresponding to the request, an invoker to which the response data corresponding to the request belongs. In step S3033, the distributed cellular communications module 3022 of the first device performs restoration processing on the offset-processed serial parameter in the response data corresponding to the request, and then sends the response data corresponding to the request to the distributed cellular communications module 3011 of the second device, the distributed cellular communications module 3011 of the second device returns the response data corresponding to the request to the telephony manager 3012 of the second device, and the telephony manager 3012 returns the response data corresponding to the request to the SMS message application. In step S3034, the distributed cellular communications module 3022 of the first device performs restoration processing on the offset-processed serial parameter in the response data corresponding to the request, and then returns the response data corresponding to the request to the telephony manager 3023 of the first device, and the telephony manager 3023 of the first device returns the response data corresponding to the request to the SMS message application.

It should be noted that there are many forms of establishing a communication connection between the distributed bus 3013 of the second device and the distributed bus 3024 of the first device, and the communication connection may be established in a wired form, or the communication connection may be established in a wireless form. Different manners of establishing the communication connection between the second device and the first device do not affect implementation of this embodiment of this application.

It should be further noted that a transmission process of an indication of the second device may be consistent with the transmission process of the response data of the second device, and a transmission process of an indication of the first device may also be consistent with the transmission process of the response data of the first device. Details are not described herein.

In this embodiment provided in this application, the first device and the second device may be provided with interface proxies, to process a request sent by an invoker, for example, offset a serial value, so as to distinguish between different invokers. An advantage of this manner is that the first device does not need to be separately provided with different interfaces for a plurality of invokers, thereby effectively saving resources.

For a process of processing the request and the response data in the telephony manager in FIG. 3a(1) and FIG. 3a(2), refer to a related part of the telephony manager in FIG. 1a. Details are not described herein.

Based on the request processing system shown in FIG. 3a(1) and FIG. 3a(2), the following specifically describes, with reference to FIG. 4A and FIG. 4B, a process of processing a request between the second device and the first device in this embodiment of this application.

Referring to FIG. 4A and FIG. 4B, that both the second device and the first device are electronic devices with an Android operating system is used as an example, where the second device is a requester (or a user) of a cellular communication capability, and the first device is a provider of the cellular communication capability. The request processing method may specifically include the following steps.

S401. The second device sends a socket (socket) connection request to the first device.

The socket connection request carries information used to describe each invoker on the second device. In a preparation phase in which the second device and the first device share a modem of the first device, a connection relationship needs to be first established between the second device and the first device. Therefore, the second device sends the socket connection request to the first device. An invoker on the second device is configured to deliver a request. The request delivered by the invoker may be a request that needs to be processed by the modem.

In some embodiments, the second device uses the socket connection request to carry information about the invoker that requires the modem of the first device to process the request, to send the information to the first device. The invoker may be the telephony manager 3012 in FIG. 3a(1) and FIG. 3a(2), an IMS, or the like. For example, there are two telephony managers in the second device, and the second device requires the modem of the first device to process requests delivered by the two telephony managers in the second device. Therefore, information about the two telephony managers is carried when the socket connection request is sent to the first device.

In some embodiments, the information used to describe each invoker on the second device may be information specific to the invoker, for example, an address or a name of each invoker on the second device.

To establish a socket connection between the second device and the first device, at least one pair of sockets is required, where one socket runs on the second device (that is, a user of the cellular communication capability) and the other socket runs on the first device (that is, a provider of the cellular communication capability).

In some embodiments, a distributed cellular communications module of the second device may submit a socket connection request to a distributed cellular communications module of the first device by using a socket of the second device. The socket connection request describes a socket of the first device to be connected, and indicates an address and a port number of the socket of the first device, and the socket connection request also describes the socket of the second device. The distributed cellular communications module of the second device may be shown in FIG. 3a(1) and FIG. 3a(2).

When creating the socket connection request, the second device may specify a protocol to be used, for example, a transmission control protocol (Transmission Control Protocol, TCP) and a user datagram protocol (User Datagram Protocol, UDP).

In some embodiments, before step S401 is performed, the method may further include: The first device enables a cellular communication capability sharing function. The second device queries a device that enables a cellular communication capability sharing function in a network, and then selects the first device from all found devices that enable a cellular communication capability sharing function. Further, the second device performs step S401. In some embodiments, the first device may enable the cellular communication capability sharing function in response to an operation of a user. For example, the first device may enable the cellular communication capability sharing function by using the distributed cellular communications module of the first device. The distributed cellular communications module of the first device may be disposed at an application framework layer of the first device, as shown by the distributed cellular communications module 3022 shown in FIG. 3a(1) and FIG. 3a(2). In some other embodiments, the first device may enable the cellular communication capability sharing function through cooperation of one or more modules in the first device.

When the first device enables the cellular communication capability sharing function, the first device is in a state that the first device can be discovered by another device. When discovering the first device, the another device may know that the cellular communication capability sharing function of the first device is enabled currently, and can be shared by another device. Then, the second device may discover the first device, and send the socket connection request to the first device.

There are many manners for enabling the first device to be in the state that the first device can be discovered by another device. For example, the first device enables Bluetooth, so that the first device can be discovered by another device that enables a Bluetooth function; the first device accesses a local area network, so that the first device can be discovered by another device in the local area network; the first device accesses a near field network (for example, a wireless network), so that the first device can be discovered by another device in the near field network; or the first device logs in to an account, so that the first device can be discovered by another device under the account.

S402. The first device establishes a connection to the second device in response to the socket connection request, and returns an identifier corresponding to each invoker to the second device.

In response to the socket connection request, an identifier corresponding to each invoker described in the socket connection request is allocated to the invoker. The identifier corresponding to the invoker is unique and specific to the invoker. In some embodiments, the identifier may be an identification number. For example, the socket connection request carries information about two telephony managers. The first device allocates an identification number 1 to one of the telephony managers, and allocates an identification number 2 to the other telephony manager. It should be noted that a format or content of the identifier is not limited in this embodiment of this application. In addition, a rule in which the first device allocates the identifier to the invoker may be arbitrarily set. This is not limited in this embodiment of this application.

In some embodiments, the first device further pre-allocates an identifier corresponding to each invoker on the first device. The identifier allocated by the first device to each invoker (regardless of whether the invoker belongs to the second device or the first device) is unique. For example, there is one telephony manager in the first device, there are two telephony managers in the second device, an identification number allocated by the first device to the telephony manager of the first device is 1, an identification number allocated by the second device to one telephony manager of the second device is 2, and an identification number allocated by the first device to the other telephony manager of the second device is 3.

In some embodiments, the distributed cellular communications module of the first device may respond to the socket connection request after receiving the socket connection request sent by the second device, then perform some authentication operations on the connection request, and establish a connection to the distributed cellular communications module of the second device after the authentication succeeds. In some embodiments, the distributed cellular communications module of the first device and the distributed cellular communications module of the second device may establish a connection by using a distributed bus. After the connection is established, the distributed bus may keep a connection channel uninterrupted. The distributed bus may further be in a low-power standby mechanism, is in a working state only when sending work needs to be performed by the distributed bus, and is in a low-power standby state at another moment. For example, the distributed cellular communications module of the second device and the distributed cellular communications module of the first device may establish a connection by using the distributed bus 3013 and the distributed bus 3024 shown in FIG. 3a(1) and FIG. 3a(2).

After the connection to the second device is established, communication may be implemented between the second device and the first device, and the first device may return, to the second device by using the distributed bus, the identifier corresponding to each invoker that is allocated to the second device.

It should be noted that step S401 and step S402 are merely an implementation of establishing a connection between the second device and the first device, and a difference between specific manners of establishing a connection between the second device and the first device does not affect implementation of this embodiment of this application.

It should be further noted that there are many manners in which the second device sends the information used to describe each invoker on the second device to the first device. In some other embodiments, when sending a cellular communication capability sharing request to the first device, the second device may use the cellular communication capability sharing request to carry the information used to describe each invoker on the second device, to send the information to the first device. In response to the cellular communication capability sharing request, the first device allocates an identifier corresponding to each invoker on the second device to the invoker, and then returns the identifier corresponding to each invoker to the second device. Alternatively, after the second device and the first device establish a connection, the second device sends the information used to describe each invoker on the second device to the first device, the first device allocates an identifier to each invoker on the second device, and then the first device returns the identifier corresponding to each invoker to the second device.

There are many manners in which the first device returns the identifier corresponding to each invoker on the second device to the second device. This embodiment of this application sets no limitation on a manner in which the first device returns the identifier corresponding to each invoker on the second device to the second device.

S403. The second device creates a proxy object of a client end of an HIDL interface of the second device.

In some embodiments, the proxy object of the client end of the HIDL interface of the second device is configured to receive a request of an invoker on the second device, and forward the request to the first device.

Specifically, a process of performing step S403 may be: creating a proxy object oriented to the client end of the HIDL interface based on the foregoing mentioned technology of the proxy mode. In some embodiments, the client end of the HIDL interface may be a client end of an RIL interface. The created proxy object of the client end of the HIDL interface has all functions of the native client end of the HIDL interface, and other functions are extended. In a manner of extending an additional function operation when the proxy object oriented to the client end of the HIDL interface of the second device is created, the proxy object of the client end of the HIDL interface of the second device can forward a request of a local invoker on the second device to the first device. For example, the proxy object of the client end of the HIDL interface of the second device can forward the request of the local invoker on the second device to the distributed cellular communications module of the first device.

It should be noted that for a specific principle description of the proxy mode, refer to a related part of the proxy mode mentioned above. Details are not described herein again. For a detailed description of a function of the native client end of the HIDL interface, refer to a related part of the foregoing solution in which the application side delivers a request to the modem for processing. Details are not described herein again.

In some embodiments, the second device creates, by using an interface proxy module, the proxy object oriented to the client end of the HIDL interface of the second device, where the interface proxy module may be the interface proxy module 3022A in FIG. 3a(1) and FIG. 3a(2).

After creating the proxy object oriented to the client end of the HIDL interface of the second device, the second device can provide a proxy for the client end of the HIDL interface of the second device. Further, when an invoker on the second device delivers a request, the delivered request is received by the proxy object of the client end of the HIDL interface of the second device, then is forwarded to the first device, and is processed by using the modem of the first device, so that the second device has a basic configuration for using the cellular communication capability of the first device.

In some embodiments, creating the proxy object of the client end of the HIDL interface of the second device may be understood as creating a proxy object of a request interface of the second device. The request interface of the second device is an interface invoked by the client end of the HIDL interface of the second device to a server end of the HIDL interface.

There may be a plurality of invokers or only one invoker on the second device, and operating systems to which a plurality of invokers on the second device belong may be the same or different. This is not limited in this embodiment of this application.

If there are a plurality of invokers on the second device, when step S403 is performed, a proxy object of a client end of an HIDL interface corresponding to each invoker may be created, that is, proxy may be provided for client ends of HIDL interfaces corresponding to all invokers.

In some embodiments, an instance of the client end of the HIDL interface invoked by the invoker on the second device may be changed to the proxy object of the client end of the HIDL interface of the second device that is created in step S403, so that in a subsequent request processing process after step S403, the invoker may not invoke the native client end of the HIDL interface, but invoke the proxy object of the client end of the HIDL interface of the second device that is created in step S403.

It should be noted that neither of a type and a specific manner of the interface for which the second device provides proxy in step S403 is limited. In addition to creating the proxy object of the client end of the HIDL interface, the first device may also create a proxy object of a client end of another type of interface.

S404. The first device creates a proxy object of a client end of an HIDL interface of the first device.

The proxy object of the client end of the HIDL interface of the first device is configured to receive a request of an invoker on the first device, and send the request of the invoker on the first device to a server end of the HIDL interface of the first device, and is further configured to receive response data that is corresponding to the request and that is returned by the server end of the HIDL interface of the first device. The response data that is corresponding to the request and that is returned by the server end of the HIDL interface of the first device includes data belonging to the invoker on the first device and data belonging to the invoker on the second device, that is, response data corresponding to requests of all invokers is invoked back to the proxy object of the client end of the HIDL interface of the first device by using the server end of the HIDL interface of the first device.

There may be a plurality of invokers or only one invoker on the first device, and operating systems to which a plurality of invokers on the first device belong may be the same or different. Neither a quantity of invokers nor an operating system to which an invoker belongs is limited in this embodiment of this application. If there are a plurality of invokers on the first device, when step S404 is performed, a proxy object of a client end of an HIDL interface corresponding to each invoker on the first device may be created, that is, proxy may be provided for client ends of HIDL interfaces corresponding to all invokers on the first device.

It should be noted that neither of a type and a specific manner of the interface for which the first device provides proxy in step S404 is limited. In addition to creating the proxy object of the client end of the HIDL interface, the first device may also create a proxy object of a client end of another type of interface.

Specifically, a process of performing step S404 may be: creating a proxy object oriented to the client end of the HIDL interface on the first device based on the proxy mode that is a design mode. In some embodiments, the client end of the HIDL interface may be a client end of an RIL interface. The created proxy object of the client end of the HIDL interface of the first device has a function of the native client end of the HIDL interface of the first device, and may extend another function.

It should be noted that for a specific principle description of the proxy mode, refer to a related part of the proxy mode mentioned above. Details are not described herein again. For a detailed description of a function of the native client end of the HIDL interface, refer to a related part of the foregoing solution in which the application side delivers a request to the modem for processing. Details are not described herein again.

In some embodiments, creating the proxy object of the client end of the HIDL interface of the first device may be understood as creating a proxy object of a request interface and a proxy object of a response interface of the first device. Specifically, the client end of the HIDL interface performs asynchronous invocation, that is, an interface that receives a request at the client end and an interface that receives response data at the client end are not a same interface. Therefore, when step S404 is performed, the proxy object of the request interface of the first device and the proxy object of the response interface may be separately created. The request interface of the first device is an interface invoked by the client end of the HIDL interface of the first device to a server end of the HIDL interface. The response interface of the first device is an interface invoked by the server end of the HIDL interface of the first device back to the client end of the HIDL interface.

In some embodiments, an instance of the client end of the HIDL interface invoked by the invoker on the first device may be changed to the proxy object of the client end of the HIDL interface of the first device that is created in step S404, so that in a subsequent request processing process after step S404, the invoker may not invoke the native client end of the HIDL interface, but invoke the proxy object of the client end of the HIDL interface of the first device that is created in step S404.

In some embodiments, step S404 may be performed by using an interface proxy module. The interface proxy module may be the interface proxy module 3022A shown in FIG. 3a(1) and FIG. 3a(2).

In some embodiments, both step S403 and step S404 may be performed by using the interface proxy module, that is, the interface proxy module may create client ends of HIDL interfaces corresponding to all invokers in the first device and the second device, and provide proxy for client ends of all HIDL interfaces in the first device and the second device. Further, by performing step S403 and step S404, the interface proxy module can receive requests of all invokers, send the requests to the modem by using a server end of only one HIDL interface of the first device, and receive response data that is corresponding to the requests of all the invokers and that is sent by the server end of the HIDL interface of the first device.

In some embodiments, the interface proxy module may be partially disposed at the application framework layer of the first device, and partially disposed at the application framework layer of the second device. For example, the interface proxy module may include the interface proxy module 3011A and the interface proxy module 3022A that are shown in FIG. 3a(1) and FIG. 3a(2).

In some embodiments, there may be a plurality of occasions of creating the proxy object of the first device. For example, in step S404, creation may be automatically triggered after step S402 is performed, or the proxy object may be preset before delivery. This is not limited in this embodiment of this application.

It should be noted that there are many manners of triggering execution of step S403 and step S404. This is not limited in this embodiment of this application.

It can be learned from the foregoing content that proxy objects of client ends of all HIDL interfaces of the first device and the second device are created in step S403 and step S404, so that all requests and response data corresponding to the requests can be processed by using a server end of only one HIDL interface of the first device, that is, client ends of HIDL interfaces corresponding to a plurality of invokers are supported in invoking a server end of a same HIDL interface.

It may be understood that, step S401 to step S404 are equivalent to configuration work that needs to be performed by the first device and the second device in cooperation with each other to meet a requirement for using a server end of one HIDL interface to process requests delivered by all invokers in a cellular communication sharing scenario. Through step S401 to step S404, the second device has all cellular communication capabilities of the first device. Subsequently, in a processing process of each request, the foregoing step S401 to step S404 do not need to be repeatedly performed.

Figure 5A:
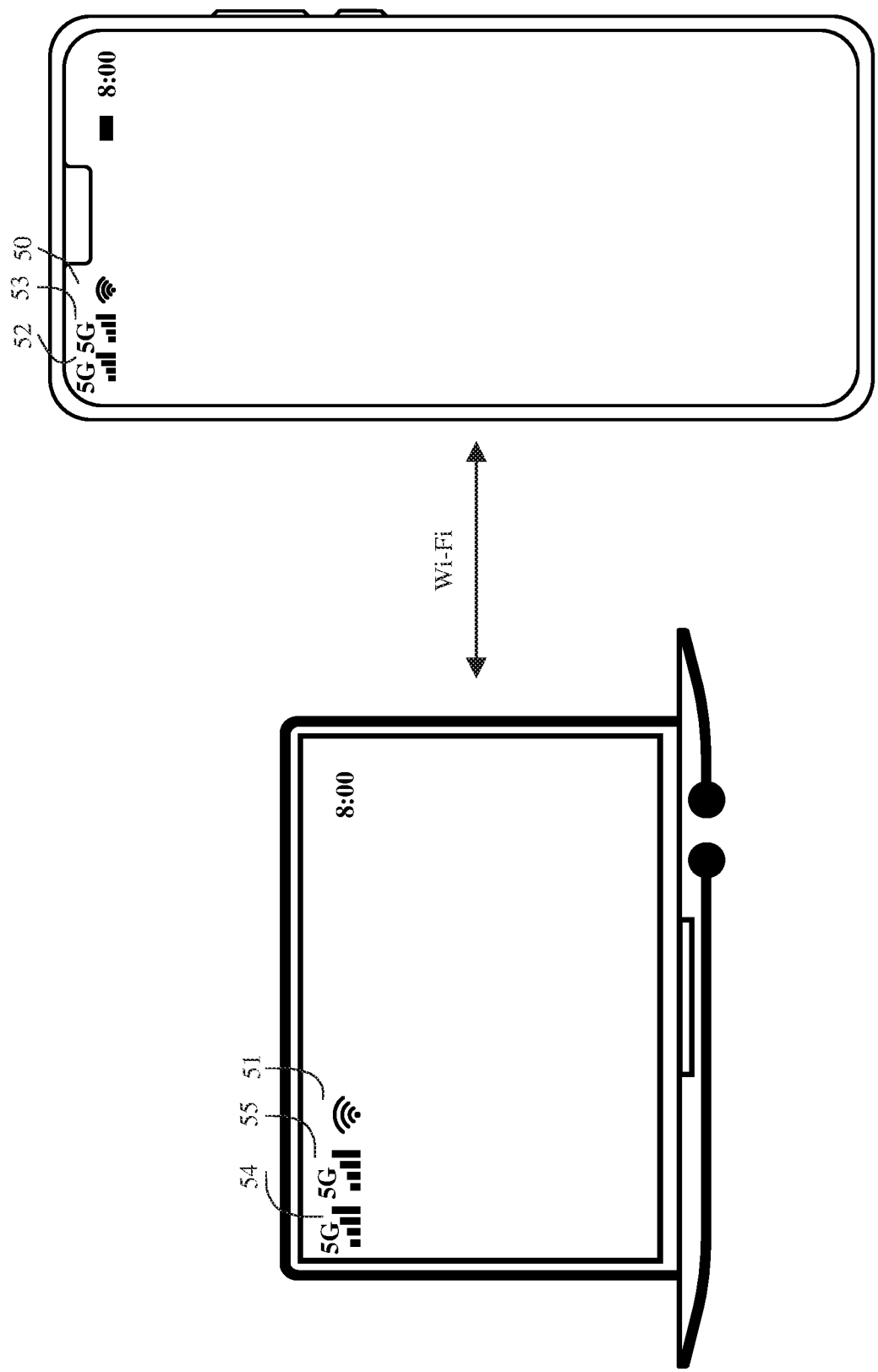
FIG. 5a is a schematic diagram of a scenario in which cellular communication capability sharing configuration is completed according to this application.

For example, as shown in FIG. 5a, when the second device is a notebook computer and the first device is a mobile phone, a Wi-Fi icon 50 is displayed in an interface after the mobile phone is connected to Wi-Fi, and a Wi-Fi icon 51 is displayed in an interface after the notebook computer is connected to Wi-Fi. The mobile phone and the notebook computer establish a connection by accessing same Wi-Fi, and after the mobile phone and the notebook computer cooperate to complete step S401 to step S404, both a 5G signal status of a SIM card 1 and a 5G signal status of a SIM card 2 on the mobile phone are shared with the notebook computer. Signal statuses displayed by a 5G signal status icon 52 of the SIM card 1 and a 5G signal status icon 53 of the SIM card 2 on the mobile phone are consistent with signal statuses displayed by a 5G signal status icon 54 and a 5G signal status icon 55 on the notebook computer, and the notebook computer can synchronously obtain the signal statuses on the mobile phone.

It should be noted that step S401 to step S404 are merely a configuration manner in which requests of a plurality of invokers are processed by using a server end of a single HIDL interface of the first device, and other configuration manners may be implemented. A difference between configuration manners does not affect implementation of this embodiment of this application.

S405. An invoker on the second device invokes the proxy object of the client end of the HIDL interface of the second device, and delivers a request of the invoker to the proxy object of the client end of the HIDL interface of the second device.

The request of the invoker carries an identifier of the invoker, and is used to describe the invoker to which the request belongs. The identifier of the invoker is allocated by the first device to the invoker on the second device. For details, refer to related content mentioned in the foregoing step S402. Details are not described herein again.

Specifically, the invoker on the second device invokes a proxy object of a client end of an HIDL interface corresponding to the invoker, to send the request of the invoker to the proxy object of the client end of the HIDL interface corresponding to the invoker. In step S403, the proxy object of the client end of the HIDL interface of the second device is created in advance. Therefore, when any invoker on the second device delivers a request, the request can be sent to the proxy object of the client end of the HIDL interface of the second device, that is, the proxy object of the client end of the HIDL interface of the second device receives requests delivered by all invokers on the second device. The identifier of the invoker may be carried in the request of the invoker, or may be independently sent to the proxy object of the client end of the HIDL interface. For a trigger manner, a generation manner, a specific request type, a quantity, and content of the request of the invoker, refer to regulations of an operating system such as Android or iOS. This is not limited in this embodiment of this application.

In some embodiments, if step S403 is performed by using the interface proxy module, an implementation of step S405 is as follows: The invoker on the second device invokes the interface proxy module, and delivers the request of the invoker to the interface proxy module.

In some embodiments, the invoker may be the telephony manager 3012 shown in FIG. 3a(1) and FIG. 3a(2). As shown in FIG. 3a(1) and FIG. 3a(2), a manner in which step S405 is performed may be: The telephony manager 3012 invokes the interface proxy module 3011A, and delivers an SMS message sending request to the interface proxy module 3011A.

S406. The second device offsets, based on the identifier of the invoker, a serial parameter in the request of the invoker by an offset value corresponding to the invoker, so that a processed serial parameter in the request can be used to describe the invoker to which the request belongs.

Specifically, in step S405, the request received by using the proxy object of the client end of the HIDL interface of the second device has a serial parameter, and the serial parameter represents a quantity of times the invoker sends a request. For a request of each invoker, a serial parameter in the request is consistent with a serial parameter in response data corresponding to the request. Therefore, the invoker may determine, by using a serial parameter, a specific request corresponding to received response data. For each invoker, each time the invoker delivers a request of the invoker, a serial parameter in the request of the invoker increases by 1 compared with a serial parameter in a request delivered last time, that is, the serial parameter in the request of the invoker can indicate a quantity of times the invoker delivers the request. For example, as shown in FIG. 3a(1) and FIG. 3a(2), when the invoker on the second device is the telephony manager 3012, a serial parameter in a request delivered for the first time by the telephony manager 3012 is 1, a serial parameter in a request delivered for the second time is 2, . . . , and so on. The serial parameter in the request delivered by the telephony manager 3012 can reflect which time the telephony manager 3012 sends the request.

The processed serial parameter in the request in step S406 is an offset-processed serial parameter. Through processing in step S406, for the requests of all the invokers in step S405, the invokers to which the requests belong can be identified by using processed serial parameters. For example, if there are two telephony managers in the second device, after requests of the two telephony managers are processed in step S406, which telephony manager is an invoker to which a request belongs can be identified by reading a processed serial parameter. It should be noted that, after the request of the invoker on the first device that is processed in step S406 is processed by the modem of the first device in the following step, response data corresponding to the request of the invoker still carries a serial parameter that is consistent with that in step S406. Therefore, after processing in step S406, in subsequently obtained response data corresponding to the request of the invoker, the invoker to which the request belongs can also be identified.

In some embodiments, a list between identifiers of all invokers and offset values corresponding to the invokers may be preset, so that offset values corresponding to different invokers are different from each other, and value ranges of serial parameters in requests of different invokers do not overlap. The list between identifiers of all invokers and offset values corresponding to the invokers may be pre-stored in the second device and the first device. All the invokers include both the invoker on the second device and the invoker on the first device. When the proxy object of the client end of the HIDL interface of the second device receives a request of an invoker, an offset value corresponding to the invoker is searched for in the list by using an identifier of the invoker to which the request belongs, and then a serial parameter in the request of the invoker is offset by the offset value corresponding to the invoker. After offset processing, value ranges to which serial parameters in requests of different invokers belong are different, and a value range of each serial parameter is corresponding to one invoker. Therefore, a processed serial parameter in the request can be used to describe the invoker to which the request belongs.

For example, a value range of the processed serial parameter may be used to describe the invoker to which the request belongs. For example, as shown in the following Table 1, a relationship between an identifier of an invoker and an offset value corresponding to the invoker may be set as follows: When the identifier (Client Id) of the invoker is 1, a value range of a serial parameter corresponding to the identifier is set to 0 to offset value−1; when Client Id is 2, a value range of a serial parameter corresponding to the identifier is set to offset value to 2*offset value−1; or when Client Id is N, a value range of a serial parameter corresponding to the identifier is set to (N−1)*offset value to N*offset value−1. That is, when the identifier of the invoker is N, the serial parameter in the request corresponding to the invoker needs to be offset by (N−1)*offset value. Herein, offset value is a preset value, for example, offset value may be preset to 10000000.

TABLE 1

|  | ClientId = 1 | ClientId = 2 | ClientId = N |
| --- | --- | --- | --- |
| Value range of a serial parameter in a request | 0 to offset value − 1 | offset value to 2 * offset value − 1 | (N − 1) * offset value to N * offset value − 1 |

TABLE 1-continued

|  | ClientId = 1 | ClientId = 2 | ClientId = N |
| --- | --- | --- | --- |
| Value range of a serial parameter corresponding to a request | 0 to offset value − 1 | offset value to 2 * offset value − 1 | (N − 1) * offset value to N * offset value − 1 |

For example, the first device has one telephony manager, an allocated invoker identifier of the telephony manager is 1, the second device has two telephony managers, and invoker identifiers allocated by the first device are 2 and 3 respectively. When offset value is 10000000, a value range of a serial parameter corresponding to the telephony manager whose Client Id is 1 is 0 to 9999999, that is, an offset value by which a serial parameter in a request delivered by the telephony manager whose Client Id is 1 needs to be offset is 0; a value range corresponding to the telephony manager whose Client Id is 2 is 10000000 to 19999999, that is, an offset value by which a serial parameter in a request delivered by the telephony manager whose Client Id is 2 needs to be offset is 10000000; and a value range corresponding to the telephony manager whose Client Id is 3 is 20000000 to 19999999, that is, an offset value by which a serial parameter in a request delivered by the telephony manager whose Client Id is 3 needs to be offset is 20000000. It may be learned that offset values corresponding to identifiers of different invokers are different, and therefore, after requests delivered by different invokers are processed in step S406, processed serial parameters in the requests can indicate the invokers to which the requests belong.

It should be noted that a correspondence between an identifier of an invoker and an offset value corresponding to the invoker may be freely set, provided that after a serial parameter in a request of an invoker is offset by an offset value corresponding to the invoker, the invoker to which the request belongs can be indicated by using a processed serial parameter in the request. A difference between offset value setting rules corresponding to invokers does not affect implementation of this embodiment of this application.

It should be further noted that there are many manners of processing the serial parameter in the request according to the identifier of the invoker. In addition to the offset-based processing manner, other calculation processing may be performed on the serial parameter by using another calculation rule. A difference between manners of processing the serial parameter in the request of the invoker does not affect implementation of this embodiment of this application, provided that a processed serial parameter in the request can be used to indicate the invoker to which the request belongs.

In some embodiments, step S406 may be performed by using an interface proxy module. For example, based on the foregoing technology of the proxy mode, when step S403 is performed, an additional function may be extended for the proxy object of the client end of the HIDL interface of the second device that is created by the interface proxy module, so that the proxy object of the client end of the HIDL interface of the second device may perform step S406 when receiving a request of an invoker on the second device. The interface proxy module that performs step S406 may be the interface proxy module 3011A in FIG. 3a(1) and FIG. 3a(2).

S407. The second device forwards the request of the invoker on the second device to the first device.

It may be learned from related content of step S403 that the proxy object of the client end of the HIDL interface of the second device that is created by the second device can forward the received requests of all the invokers to the first device. Therefore, the second device can perform step S407 by using the proxy object of the client end of the HIDL interface of the second device. The request of the invoker forwarded in step S407 is a request processed in step S406, that is, a serial parameter in the request forwarded in step S407 can be used to indicate the invoker to which the request belongs.

In some embodiments, the distributed cellular communications module of the second device may forward the request of the invoker on the second device to the distributed cellular communications module of the first device. For example, the interface proxy module in the distributed cellular communications module of the second device may forward the request of the invoker to the interface proxy module of the first device. For details, refer to related descriptions in FIG. 3a(1) and FIG. 3a(2). Details are not described herein again.

S408. An invoker on the first device invokes the proxy object of the client end of the HIDL interface of the first device, and delivers a request of the invoker to the proxy object of the client end of the HIDL interface of the first device.

Because the proxy object of the client end of the HIDL interface of the first device is pre-created in step S404, step S408 can be performed by using the proxy object of the client end of the HIDL interface of the first device.

For an execution process and a principle of performing step S408 by the first device, refer to related content of performing step S405 by the second device. Details are not described herein again.

It should be noted that there is no limitation on an execution sequence between step S408 performed by the first device and step S405 performed by the second device, and no interference exists between step S408 and step S405.

For a process in which the first device performs step S408, refer to related content in the process in which the telephony manager processes the request in FIG. 1a.

S409. The first device offsets, based on the identifier of the invoker, a serial parameter in the request of the invoker by an offset value corresponding to the invoker, so that a processed serial parameter in the request can be used to describe the invoker to which the request belongs.

In some embodiments, the request processed by the first device in step S409 is only a request from the invoker on the first device. For a specific execution principle and process, refer to related content of step S406 performed by the second device.

In some other embodiments, requests processed by the first device in step S409 may be requests of invokers on the first device and the second device, that is, offset processing of serial parameters in all requests may be completed by using step S409. Specifically, the second device may not perform step S406. The second device forwards the request to step S409 by using step S407, and then the first device processes the request. The request received by the first device from the second device needs to carry the identifier of the invoker, so that step S409 can be performed.

S410. The first device sends a request of each invoker to the modem of the first device by using the server end of the HIDL interface of the first device The request of each invoker in step S410 includes both a request forwarded by the second device to the first device in step S407 and a request delivered by the invoker on the first device in step S408, that is, requests of all invokers are sent to the modem of the first device by using a server end of a same HIDL interface of the first device.

It should be noted that all serial parameters in the requests sent to the modem of the first device in step S410 are offset-processed, and can indicate invokers to which the requests belong.

In some embodiments, the request of each invoker may be sent to the modem of the first device by using the interface proxy module by invoking the server end of the HIDL interface of the first device. In some other embodiments, the request of the invoker on the first device may be sent to the server end of the HIDL interface of the first device by using the proxy object of the client end of the HIDL interface of the first device. The request of the invoker on the second device may be directly transmitted to the server end of the HIDL interface of the first device by using the distributed cellular communications module of the second device. For the interface proxy module of the second device, refer to the interface proxy module 3022A in FIG. 3a(1) and FIG. 3a(2). For the distributed cellular communications module of the second device, refer to the distributed cellular communications module 3022 of the second device in FIG. 3a(1) and FIG. 3a(2).

S411. The modem of the first device obtains response data corresponding to each request through processing.

For each request, the response data corresponding to the request may be understood as a response result corresponding to the request, and the response data corresponding to the request is in a one-to-one correspondence with the request. For example, if the request is an SMS message sending request, the response data corresponding to the request may be result data used to indicate whether an SMS message is successfully sent. The response data corresponding to the request processed by the modem still carries the serial parameter. It may be learned from the foregoing content that, after the foregoing processing, the serial parameter may be used to indicate the invoker to which the request belongs. Therefore, the serial parameter in the response data corresponding to the request may also be used to know the invoker to which the request belongs. The modem processes the request in a sequence in which the modem receives the request.

It should be noted that for a format and content of the response data corresponding to the request, refer to a stipulation of an operating system such as Android or iOS. This is not limited in this embodiment of this application.

S412. The modem of the first device returns the response data corresponding to each request to the proxy object of the client end of the HIDL interface of the first device by using the server end of the HIDL interface.

It may be learned from the foregoing content in step S404 that the first device provides proxy for the client end of the HIDL interface of the first device. Therefore, the server end of the HIDL interface may invoke the response data corresponding to each request back to the proxy object of the client end of the HIDL interface of the first device, that is, the proxy object of the client end of the HIDL interface of the first device receives response data corresponding to all requests.

In some embodiments, the response data that is corresponding to each request and that is returned by the modem of the first device by using the server end of the HIDL interface may be received by using the interface proxy module of the first device. For the interface proxy module of the first device, refer to the interface proxy module 3022A in FIG. 3a(1) and FIG. 3a(2).

S413. The first device identifies, for the response data corresponding to each request based on a processed serial parameter in the response data corresponding to the request, an invoker to which the response data corresponding to the request belongs.

The processed serial parameter in the response data corresponding to the request is actually the serial parameter that is mentioned in the foregoing step and that can be used to indicate the invoker to which the request belongs. Therefore, according to the processed serial parameter in the response data corresponding to the request, the invoker to which the response data corresponding to the request belongs can be identified. Therefore, the first device can know a specific invoker to which the response data corresponding to the request is to be returned, so that the request sent by the invoker and the received response data are in a one-to-one correspondence.

From the foregoing brief description of the solution in which the application side delivers a request to the modem for processing, it can be learned that in the solution, a server end of each HIDL interface is fixedly registered with a client end of one HIDL interface, to ensure that response data corresponding to the request can be returned to an invoker corresponding to the client end of the HIDL interface. In this embodiment of this application, the invoker to which the response data corresponding to the request belongs is identified by using the processed serial parameter in the response data corresponding to the request, to ensure that the response data corresponding to the request can be returned to the invoker that initiates the request, so that requests are processed by using a server end of a same HIDL interface.

In some embodiments, the first device may perform step S413 by using an interface proxy module, for example, the interface proxy module 3022A shown in FIG. 3a(1) and FIG. 3a(2). For example, when the first device performs step S404, additional function extension may be performed on the proxy object of the client end of the HIDL interface of the first device that is created on the interface proxy module 3022A, so that the interface proxy module 3022A of the first device can perform step S413 by using the proxy object of the client end of the HIDL interface of the first device.

In some embodiments, an implementation of performing step S413 includes: performing, for the response data corresponding to each request, matching between the processed serial parameter in the response data corresponding to the request and a serial parameter value range corresponding to each invoker, and determining a matched invoker as the invoker to which the response data corresponding to the request belongs. Specifically, in some embodiments of the foregoing steps, offset processing is performed on the serial parameter in the request, so that value ranges to which requests of different invokers belong are different. For details, refer to related content in the foregoing Table 1. Details are not described herein again. The first device stores a correspondence between an identifier of an invoker and a serial parameter. Therefore, matching is performed between the processed serial parameter in the response data corresponding to the request and the serial parameter value range corresponding to each invoker, and an invoker corresponding to a matched value range can be determined as the invoker to which the response data corresponding to the request belongs. For example, as shown in Table 1, if a processed serial parameter in response data corresponding to a request matches a range of 0 to offset value−1, an identifier of an invoker to which the response data belongs is 1.

In some embodiments, after the invoker to which the response data corresponding to the request belongs is identified, an identification result and the response data corresponding to the request may be correspondingly stored.

S414. The first device returns response data belonging to the invoker on the second device to the second device.

Through identification in step S413, the first device identifies that response data corresponding to some requests belongs to the first device, and response data corresponding to some requests belongs to the second device, so that response data corresponding to requests of two different devices can be distinguished, and then the response data for the invoker on the second device is selected and returned to the second device.

In some embodiments, the distributed cellular communications module of the first device may return the response data for the invoker on the second device to the distributed cellular communications module of the second device.

S415. The second device restores, for response data corresponding to each request of the second device, a processed serial parameter in the response data corresponding to the request.

To enable the invoker to identify the response data corresponding to the request, the serial parameter processed in the foregoing step needs to be restored. Specifically, in the foregoing embodiment, the serial parameter is offset by the offset value corresponding to the invoker. In this case, the offset value may be subtracted to restore the original serial parameter. For example, as shown in Table 1, the serial parameter corresponding to the invoker whose identifier is 2 is positively offset by offset value. Therefore, in step S415, offset value used in the original offset needs to be subtracted to restore a value of the original serial parameter.

In some embodiments, step S415 may be performed by using an interface proxy module. For example, the interface proxy module may be the interface proxy module 3011A in FIG. 3a(1) and FIG. 3a(2).

In some embodiments, when there are a plurality of invokers in the second device, before step S415 is performed, the second device needs to perform a step of identifying, for the response data corresponding to each request based on a processed serial parameter in the response data corresponding to the request, an invoker to which the response data corresponding to the request belongs, to identify a specific invoker on the second device to which the response data corresponding to the request belongs. For an execution principle and a process of performing this step by the second device, refer to related content of step S413 performed by the first device. After the invoker to which the response data corresponding to each request belongs is identified, step S415 is performed.

S416. The second device returns each piece of response data of the second device to an invoker to which the response data belongs.

Figure 5B:
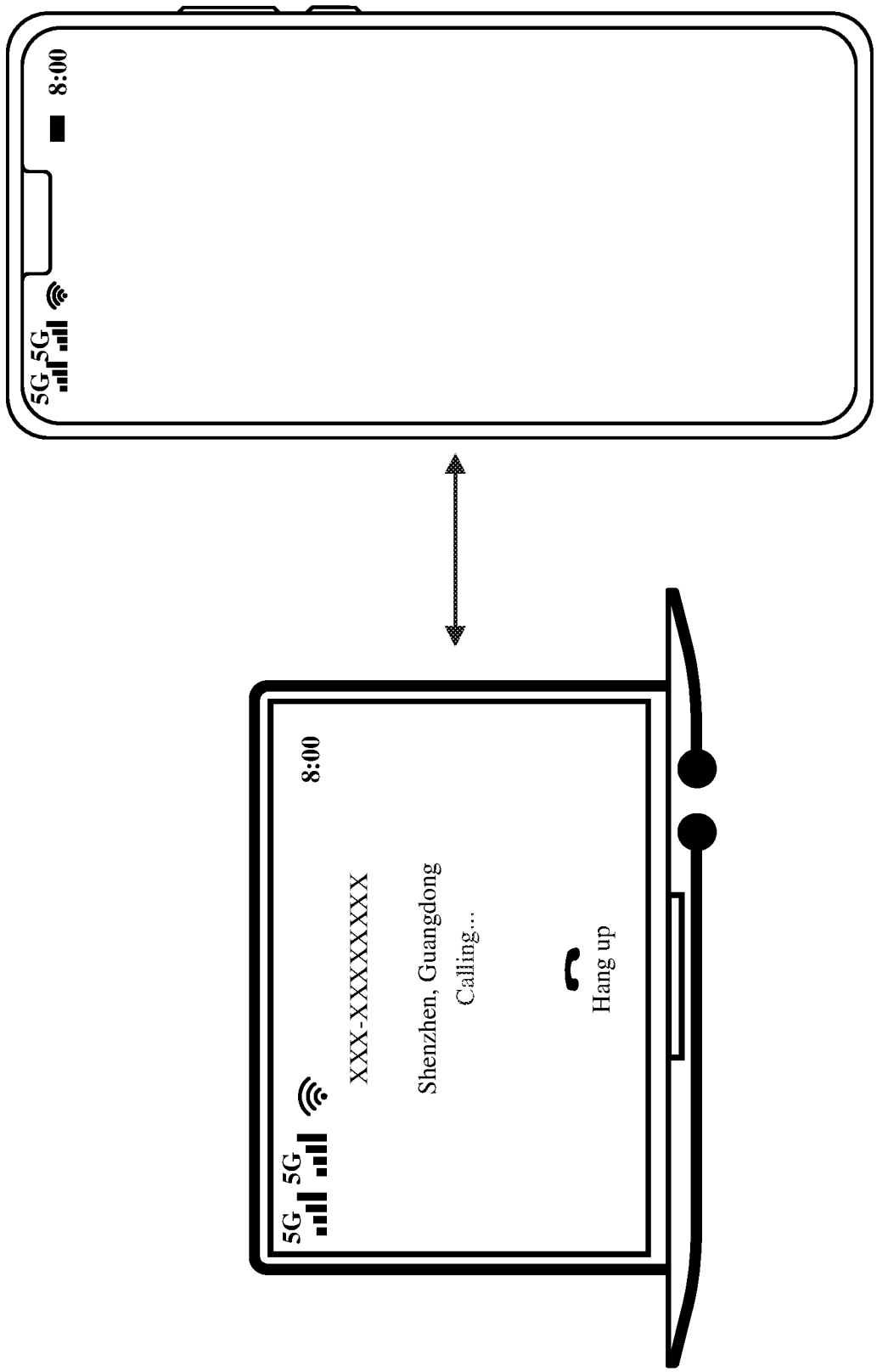
FIG. 5b is a schematic diagram of a scenario of returning response data to a device according to this application.

In the step before step S416, the invoker to which each piece of response data belongs has been identified. Therefore, after performing step S415, the second device may return the response data corresponding to each request to the invoker to which the response data corresponding to the request belongs, so that the request sent by the invoker and the received response data are in a one-to-one correspondence. For example, as shown in FIG. 5b, when the first device is a mobile phone and the second device is a notebook computer, and a request of a telephony manager in the notebook computer is to dial a mobile number in Shenzhen, Guangdong, if the mobile phone returns response data (that is, calling data) corresponding to the call request to the notebook computer, and the telephony manager of the notebook computer returns the response data and displays the response data in a phone application interface corresponding to the notebook computer, the phone application interface presents a call status of dialing the mobile number, that is, calling.

In some embodiments, the response data of each request of the first device may be returned, by using the proxy object of the client end of the HIDL interface of the second device, to the invoker to which the response data corresponding to the request belongs.

In some embodiments, the distributed cellular communications module of the second device may perform step S416. For example, refer to the related content in FIG. 3a(1) and FIG. 3a(2) in which the distributed cellular communications module 3011 of the second device returns the response data corresponding to the request to the telephony manager 3012.

S417. The first device restores, for each piece of response data belonging to the invoker on the first device, a processed serial parameter in the response data corresponding to the request.

For an execution principle and a process of performing step S417 by the first device, refer to a process in which the second device performs S415. Details are not described herein again.

In some embodiments, if there is only one invoker in the second device, the first device may not only perform restoration processing on the response data for the invoker on the first device, but also perform restoration processing on the response data of the second device, and then perform step S414 to return the response data to the second device.

It should be noted that step S416 needs to be performed after only step S413, and execution of step S414 and step S415 does not affect execution of step S416.

It may be learned from the foregoing content that, regardless of whether the first device or the second device performs restoration processing on the processed serial parameter in the response data corresponding to the request, it needs to be ensured that the invoker to which the response data belongs is already known. Currently, restoration processing can be performed only after the invoker to which the response data belongs is determined. After it is ensured that the invoker to which the response data belongs is already identified, whether restoration processing is performed by the first device or the second device may not be limited.

S418. The first device returns response data of each request of the first device to an invoker to which the response data corresponding to the request belongs.

In the foregoing step, the invoker to which each piece of response data of the first device belongs has been identified. Therefore, after performing step S417, the first device may return the response data corresponding to each request to the invoker to which the response data corresponding to the request belongs, so that the request sent by the invoker and the received response data are in a one-to-one correspondence. For example, as shown in FIG. 5c(1) to FIG. 5c(3), the first device is a mobile phone and the second device is a computer. A video APP in the mobile phone triggers a one-click login request. After a telephony manager of the mobile phone delivers the one-click login request, the telephony manager receives response data corresponding to the one-click login request. The response data indicates a one-click login success, and the telephony manager presents data of the one-click login success in a video APP interface.

In some embodiments, the response data of each request of the first device may be returned, by using the proxy object of the client end of the HIDL interface of the first device, to the invoker to which the response data corresponding to the request belongs.

In some embodiments, the distributed cellular communications module of the first device may perform step S415. For example, refer to the related content in FIG. 3a(1) and FIG. 3a(2) in which the distributed cellular communications module 3022 of the first device returns the response data corresponding to the request to the telephony manager 3023.

It should be noted that a transmission process of an indication of the second device may be consistent with a transmission process of the response data of the second device, and a transmission process of an indication of the first device may also be consistent with a transmission process of the response data of the first device. Details are not described herein.

In this embodiment of this application, the information used to indicate the invoker to which the request belongs is the processed serial parameter. In another embodiment, the information may be another type of information such as an identifier of the invoker. This is not limited in this embodiment of this application, provided that the request sent to the server end of the HIDL interface of the first device can carry the information used to indicate the invoker to which the request belongs.

Similarly, step S412 to step S418 are merely an implementation in which the invoker to which the response data corresponding to each request belongs is identified, to return the response data corresponding to each request to the invoker to which the response data belongs. A different type of the information used to indicate the invoker to which the request belongs leads to a different process of identifying the invoker to which the response data corresponding to each request belongs and returning the response data corresponding to each request to the invoker to which the response data belongs.

In conclusion, referring to the foregoing content of step S405 to step S418, in this embodiment of this application, in a cellular communication capability sharing scenario, requests delivered by invokers on a plurality of different devices can be sent to a modem by using a server end of an HIDL interface in a same device, and response data of all invokers can be returned to the invokers by using a server end of an HIDL interface in a same device.

In some other embodiments, referring to the foregoing execution principle and process of FIG. 4A and FIG. 4B, this embodiment of this application may further be applicable to a scenario in which a plurality of operating systems in the first device share one modem, or requests delivered by a plurality of invokers in a single operating system of a same device.

It may be understood that this embodiment of this application is applicable to any request processing of a plurality of invokers, and the plurality of invokers may belong to a plurality of devices or a plurality of systems, or may belong to a same device or a same system.

Further, referring to the foregoing execution principle and process of FIG. 4A and FIG. 4B, in another application scenario, requests delivered by invokers on a plurality of different devices may be sent to a server end of another type of interface in a same device, and then response data of all invokers is returned to the invokers by using the server end of the interface. That is, this embodiment of this application may also be applicable to another scenario in which requests of a plurality of invokers need to be processed by using a server end of one interface, including but not limited to the cellular communication capability sharing scenario shown in this embodiment of this application.

It should be further noted that time of delivering requests by different invokers may be random, a plurality of invokers may deliver requests at the same time or at any time separately, and different time of delivering the requests by the invokers does not affect implementation of this embodiment of this application.

In some embodiments, a field used to support receiving of an identifier of each invoker may further be preset at the client end of the HIDL interface in the first device, and a field used to support receiving of an identifier of each invoker is also preset at the server end of the HIDL interface, to perform the request processing method. Specifically, referring to FIG. 6a, this application provides another request processing method. The method is applied to the first device and may specifically include the following steps.

S601. Receive requests of a plurality of invokers through a client end of an HIDL interface.

The request of the invoker carries an identifier of the invoker. A field used to support receiving of an identifier of each invoker is preset at the client end of the HIDL interface. For example, a ClientIndex field is added to the client end of the HIDL interface, to support receiving of an identifier of each invoker client.

When the request of the invoker carries the identifier of the invoker to which the request belongs, and is transmitted to the client end of the HIDL interface, because the field used to support receiving of the identifier of each invoker is preset at the client end of the HIDL interface, subsequent processing is supported on the request that carries the identifier of the invoker.

S602. Send the requests of the plurality of invokers to a modem of the first device by using a server end of the HIDL interface.

The request of the invoker carries the identifier of the invoker. A field used to support receiving of the identifier of each invoker is preset at the server end of the HIDL interface. For example, a ClientIndex field is added to the server end of the HIDL interface, to support receiving of an identifier of each invoker client. The server end of the HIDL interface supports receiving of the identifier of each invoker. Therefore, step S602 can be performed by using the server end of the HIDL interface.

For a process and a principle of performing step S602, refer to related content of step S410 performed by the first device in FIG. 4A and FIG. 4B. Details are not described herein again.

S603. The modem of the first device obtains response data corresponding to each request through processing.

For a process and a principle of performing step S603, refer to related content of step S411 performed by the first device in FIG. 4A and FIG. 4B. Details are not described herein again.

S604. The modem of the first device returns the response data corresponding to each request to the client end of the HIDL interface of the first device by using the server end of the HIDL interface of the first device.

For a process and a principle of performing step S604, refer to related content of step S412 performed by the first device in FIG. 4A and FIG. 4B. However, different from that in step S412, the response data corresponding to each request in step S604 is returned to the client end of the HIDL interface of the first device, but the response data is returned to the proxy object of the client end of the HIDL interface of the first device in step S412.

S605. Identify, for the response data corresponding to each request based on an identifier of an invoker that is carried in the response data corresponding to the request, the invoker to which the response data corresponding to each request belongs.

Because both the server end of the HIDL interface and the client end of the HIDL interface mentioned in step S604 support receiving of the identifier of each invoker, it can also be supported that the response data that is corresponding to each request and that is returned to the client end of the HIDL interface of the first device carries the identifier of the invoker.

Further, the invoker to which the response data corresponding to each request belongs may be identified according to the identifier of the invoker carried in the response data corresponding to the request, so that in a case of a plurality of invokers, only a server end of one HIDL interface and a client end of one HIDL interface is required to ensure that the request delivered by the invoker and received response data are in a one-to-one correspondence.

In some other embodiments, step S605 may be performed by the interface proxy module 3022A in FIG. 3a(1) and FIG. 3a(2). For related descriptions of the interface proxy module 3022A, refer to related content of the interface proxy module 3022A in FIG. 3a(1) and FIG. 3a(2).

S606. Return, for the response data corresponding to each request, the response data corresponding to the request to the invoker to which the response data corresponding to the request belongs.

For an execution process and a principle of step S606, refer to step S417. Details are not described herein again.

It should be noted that the request processing method provided in this embodiment of this application is also applicable to processing of requests of invokers on a plurality of devices. In a scenario of processing requests of invokers on a plurality of devices, when step S601 is performed, the requests of the plurality of invokers received by the first device are from a plurality of devices, and include a local request of the first device and a request of another second device.

It should be further noted that a process in which the first device sends an indication to an invoker to which the indication belongs may be consistent with the process in which the response data is sent to the invoker to which the response data belongs. Details are not described herein.

Figure 6B:
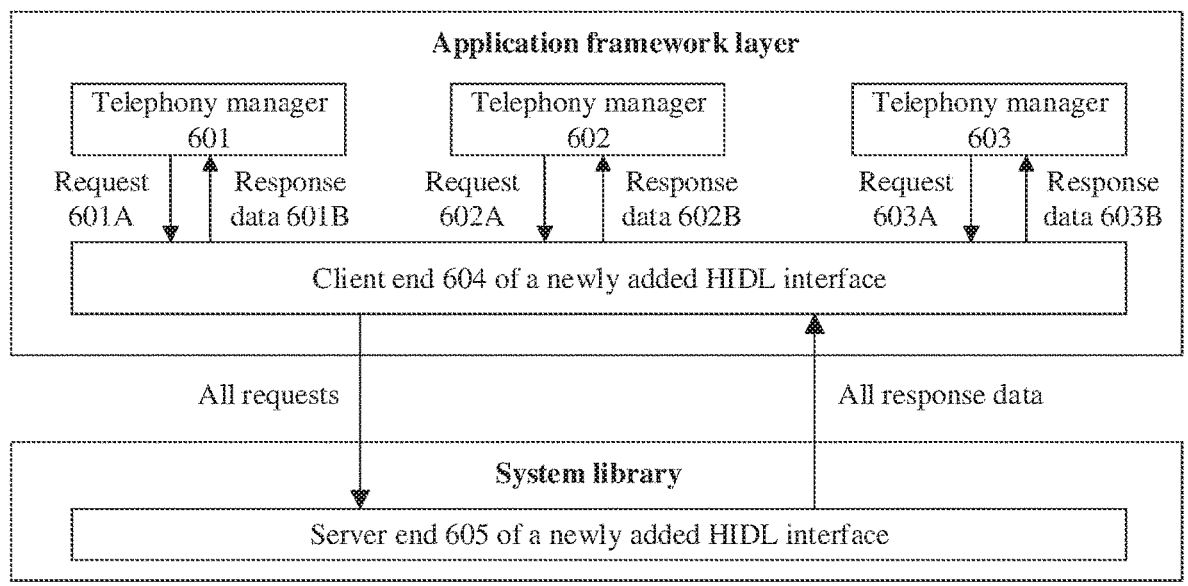
FIG. 6b is a diagram of a system architecture in the first device in FIG. 6a according to this application.

For example, a plurality of invokers are on a same device. As shown in FIG. 6b, an application framework layer of a first device in FIG. 6b includes three invokers: a telephony manager 601, a telephony manager 602, and a telephony manager 603. A client end 604 of a newly added HIDL interface is further disposed at the application framework layer, and a server end 605 of a newly added HIDL interface is disposed on a system library. For example, a specific process in which the first device shown in FIG. 6b performs the request processing method in FIG. 6a is as follows: In step S601, a request 601A of the telephony manager 601, a request 602A of the telephony manager 602, and a request 603A of the telephony manager 603 are delivered to the client end 604 of the HIDL interface. In step S602 and step S603, all the requests delivered by the plurality of telephony managers are sent to the modem of the first device by using the server end 605 of the HIDL interface, and the modem of the first device obtains response data corresponding to each request. In step S604 and step S605, the modem of the first device sends the response data corresponding to each request to the server end 605 of the HIDL interface of the first device, and the server end 605 of the HIDL interface of the first device returns the response data corresponding to each request to the client end 604 of the HIDL interface of the first device. Then, for the response data corresponding to each request, an invoker to which the response data corresponding to each request belongs is identified according to an identifier of the invoker carried in the response data corresponding to the request. In step S606, the client end 604 of the HIDL interface of the first device returns response data 601B corresponding to the request belonging to the telephony manager 601 to the telephony manager 601, returns response data 602B corresponding to the request belonging to the telephony manager 602 to the telephony manager 602, and returns response data 603B corresponding to the request belonging to the telephony manager 603 to the telephony manager 603. Time at which the telephony manager 601, the telephony manager 602, and the telephony manager 603 deliver the requests may be random.

It should be noted that, for brevity of description, interfaces (for example, the HIDL interface) in the first device in this application may be collectively referred to as a first device interface, and a newly added (or new) HIDL interface mentioned in this embodiment of this application may also be referred to as an HIDL interface for short.

It may be learned from the foregoing related content in FIG. 4A and FIG. 4B and FIG. 6a that step S401 to step S404 in FIG. 4A and FIG. 4B are not necessary steps. For example, when a plurality of invokers are in a same electronic device, a connection between two devices may not need to be established. For another example, when the request processing method in FIG. 6a is performed, a proxy object of a client end of an HIDL interface does not need to be created. In addition, offset on the serial parameter in FIG. 4A and FIG. 4B is merely an implementation to enable the request to carry the information used to indicate the invoker to which the request belongs. In FIG. 6a, an identifier of the invoker may be used as the information used to indicate the invoker to which the request belongs. Therefore, there are many specific formats, content, and the like for the information that is carried in the request and the response data corresponding to the request and that is used to indicate the invoker to which the request belongs. This is not limited in this embodiment of this application.

Figure 7:
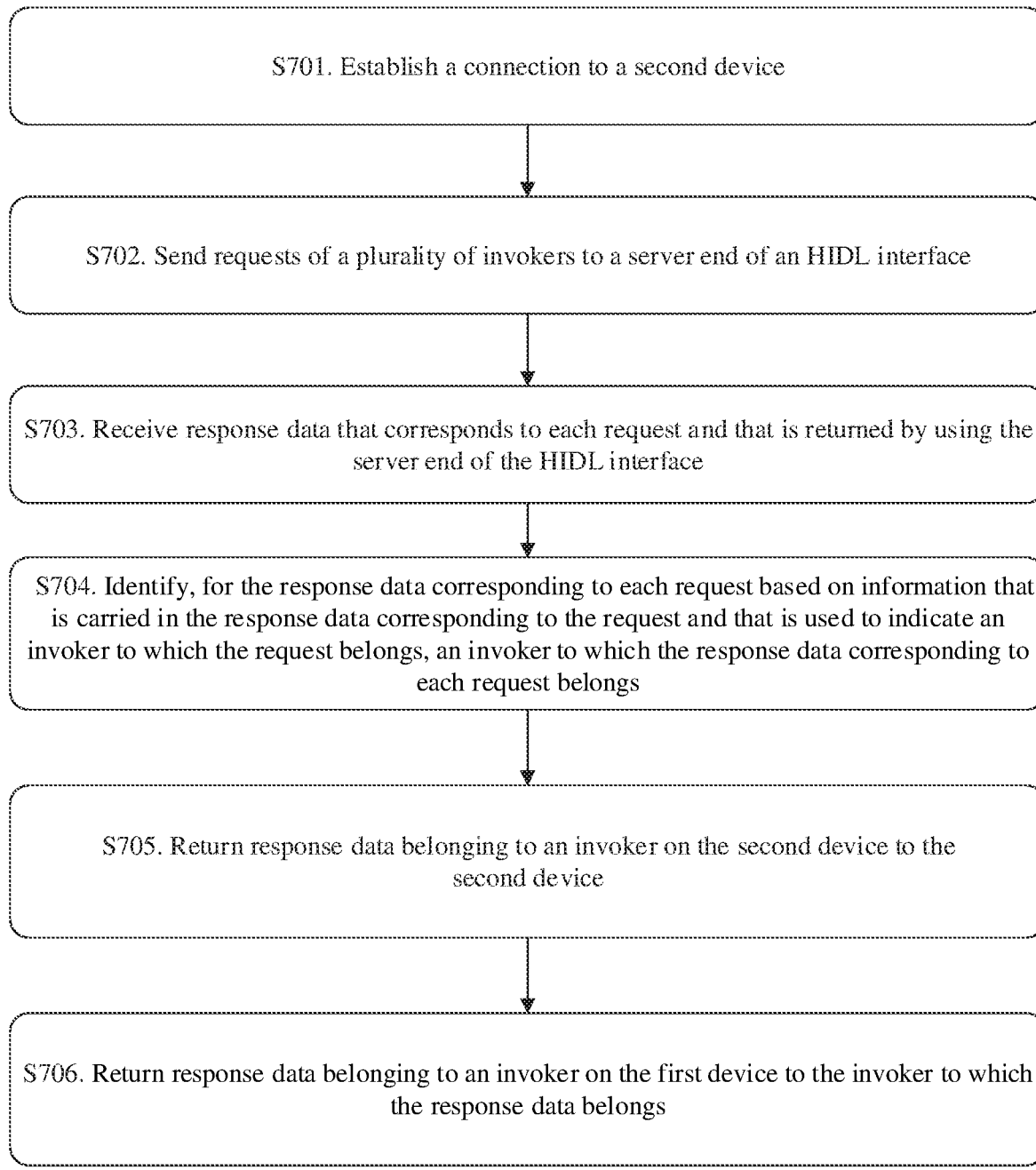
FIG. 7 is a schematic flowchart 3 of a request processing method disclosed in this application.

Referring to FIG. 7, based on the foregoing content, for a scenario of processing requests of invokers on a plurality of different devices, an embodiment of this application further discloses a request processing method. The method is applied to a first device and specifically includes the following steps.

S701. Establish a connection to a second device.

For an execution process and a principle of step S701, refer to related content in steps S401 and S402. Details are not described herein again.

S702. Send requests of a plurality of invokers to a server end of an HIDL interface.

The plurality of invokers include an invoker on the first device and a plurality of invokers on the second device. The request carries information used to indicate the invoker to which the request belongs.

For an execution process and a principle of step S702, refer to related content in step S403 to step S408 and related content in step S601 and step S602. Details are not described herein again.

S703. Receive response data that is corresponding to each request and that is returned through the server end of the HIDL interface.

For an execution process and a principle of step S703, refer to related content in step S412 and related content in step S604. Details are not described herein again. The HIDL interface mentioned in step S73 may alternatively be another type of first device interface. This is not limited in this application.

S704. Identify, for the response data corresponding to each request based on the information that is carried in the response data corresponding to the request and that is used to indicate the invoker to which the request belongs, an invoker to which the response data corresponding to each request belongs.

For an execution process and a principle of step S704, refer to related content in step S413 and related content in step S605. Details are not described herein again.

S705. Return response data belonging to the invoker on the second device to the second device.

For an execution process and a principle of step S705, refer to related content in step S414. Details are not described herein again.

S706. Return response data belonging to the invoker on the first device to the invoker to which the response data belongs.

For an execution process and a principle of step S706, refer to related content in step S417 and step S418 and related content in step S606. Details are not described herein again.

Figure 8:
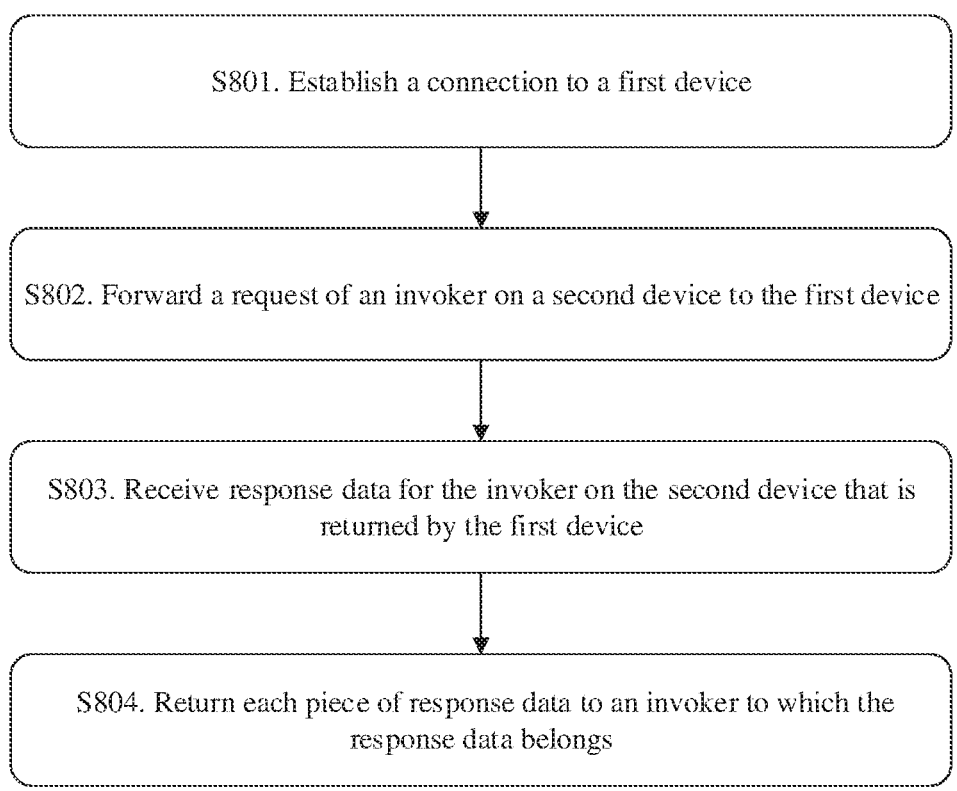
FIG. 8 is a schematic flowchart 4 of a request processing method disclosed in this application.

Referring to FIG. 8, based on the foregoing content, for a scenario of processing requests of invokers on a plurality of different devices, an embodiment of this application further discloses a request processing method. The method is applied to a second device and specifically includes the following steps.

S801. Establish a connection to a first device.

For an execution process and a principle of step S801, refer to related content in steps S401 and S402. Details are not described herein again.

S802. Forward a request of an invoker on the second device to the first device.

For an execution process and a principle of step S802, refer to related content in step S403 to step S407. Details are not described herein again.

S803. Receive response data for the invoker on the second device that is returned by the first device.

The response data carries information about the invoker to which the response data belongs.

For an execution process and a principle of step S803, refer to related content in step S414. Details are not described herein again.

S804. Return each piece of response data to an invoker to which the response data belongs.

For an execution process and a principle of step S804, refer to related content in step S415 and step S416 and related content in step S606. Details are not described herein again.

Figure 9:
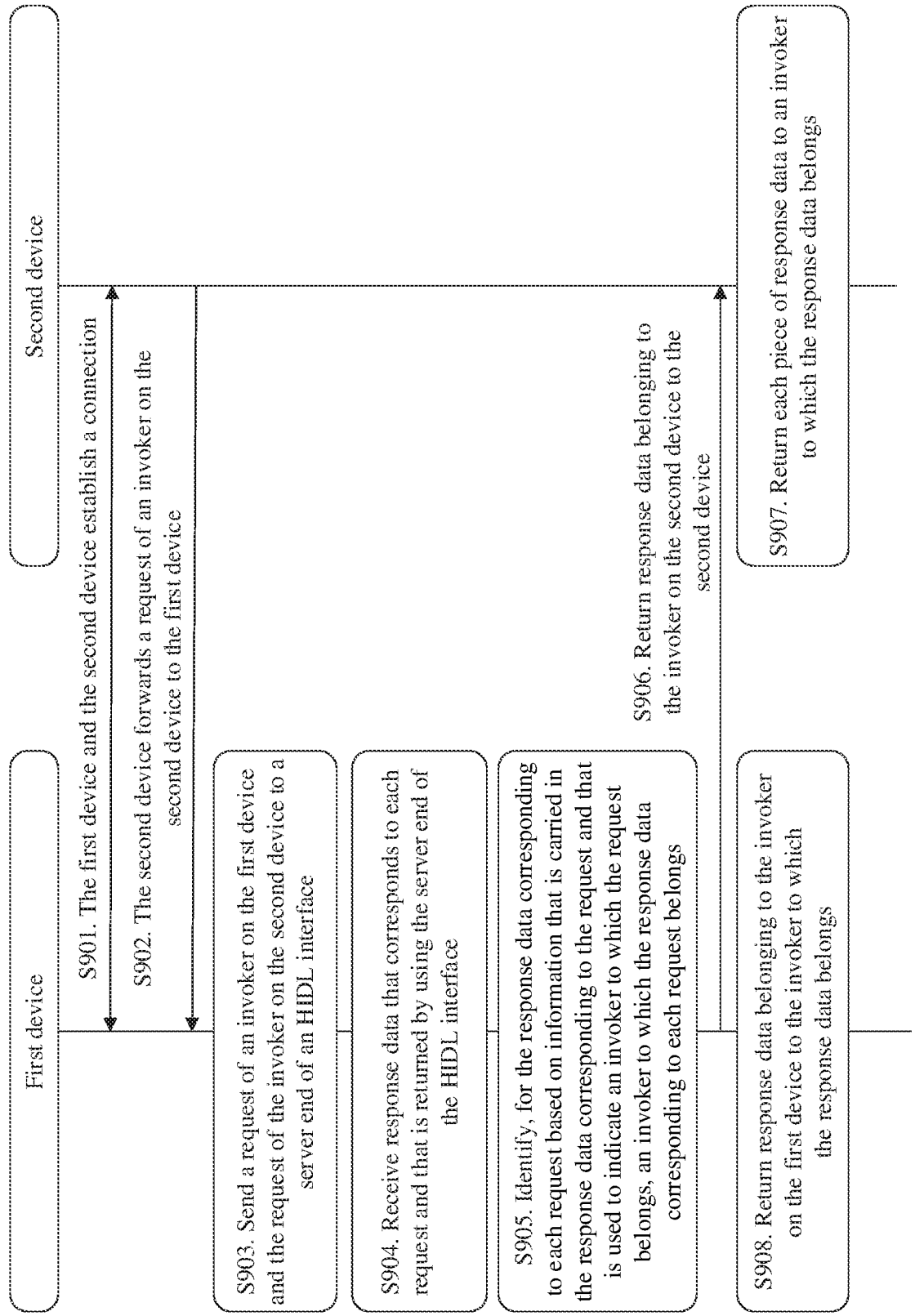
FIG. 9 is a schematic flowchart 5 of a request processing method disclosed in this application.

Referring to FIG. 9, based on the foregoing content, for a scenario of processing requests of invokers on a plurality of different devices, an embodiment of this application further discloses a request processing method. The method specifically includes the following steps.

S901. A first device and a second device establish a connection.

For an execution process and a principle of step S901, refer to related content in steps S401 and S402. Details are not described herein again.

S902. The second device forwards a request of an invoker on the second device to the first device.

For an execution process and a principle of step S902, refer to related content in step S403 to step S407. Details are not described herein again.

S903. The first device sends a request of an invoker on the first device and the request of the invoker on the second device to a server end of an HIDL interface.

For an execution process and a principle of step S903, refer to related content in step S403 to step S408 and related content in step S601 and step S602. Details are not described herein again. The HIDL interface mentioned in step S903 may alternatively be another type of first device interface. This is not limited in this application.

S904. The first device receives response data that is corresponding to each request and that is returned through the server end of the HIDL interface.

For an execution process and a principle of step S904, refer to related content in step S412 and related content in step S604. Details are not described herein again.

S905. The first device identifies, for the response data corresponding to each request based on the information that is carried in the response data corresponding to the request and that is used to indicate the invoker to which the request belongs, an invoker to which the response data corresponding to each request belongs.

For an execution process and a principle of step S905, refer to related content in step S413 and related content in step S605. Details are not described herein again.

S906. The first device returns response data belonging to the invoker on the second device to the second device.

For an execution process and a principle of step S906, refer to related content in step S414. Details are not described herein again.

S907. The second device returns each piece of response data to an invoker to which the response data belongs.

For an execution process and a principle of step S907, refer to related content in step S415 and step S416 and related content in step S606. Details are not described herein again.

S908. The first device returns response data belonging to the invoker on the first device to the invoker to which the response data belongs.

For an execution process and a principle of step S908, refer to related content in step S417 and step S418 and related content in step S606. Details are not described herein again.

Figure 10:
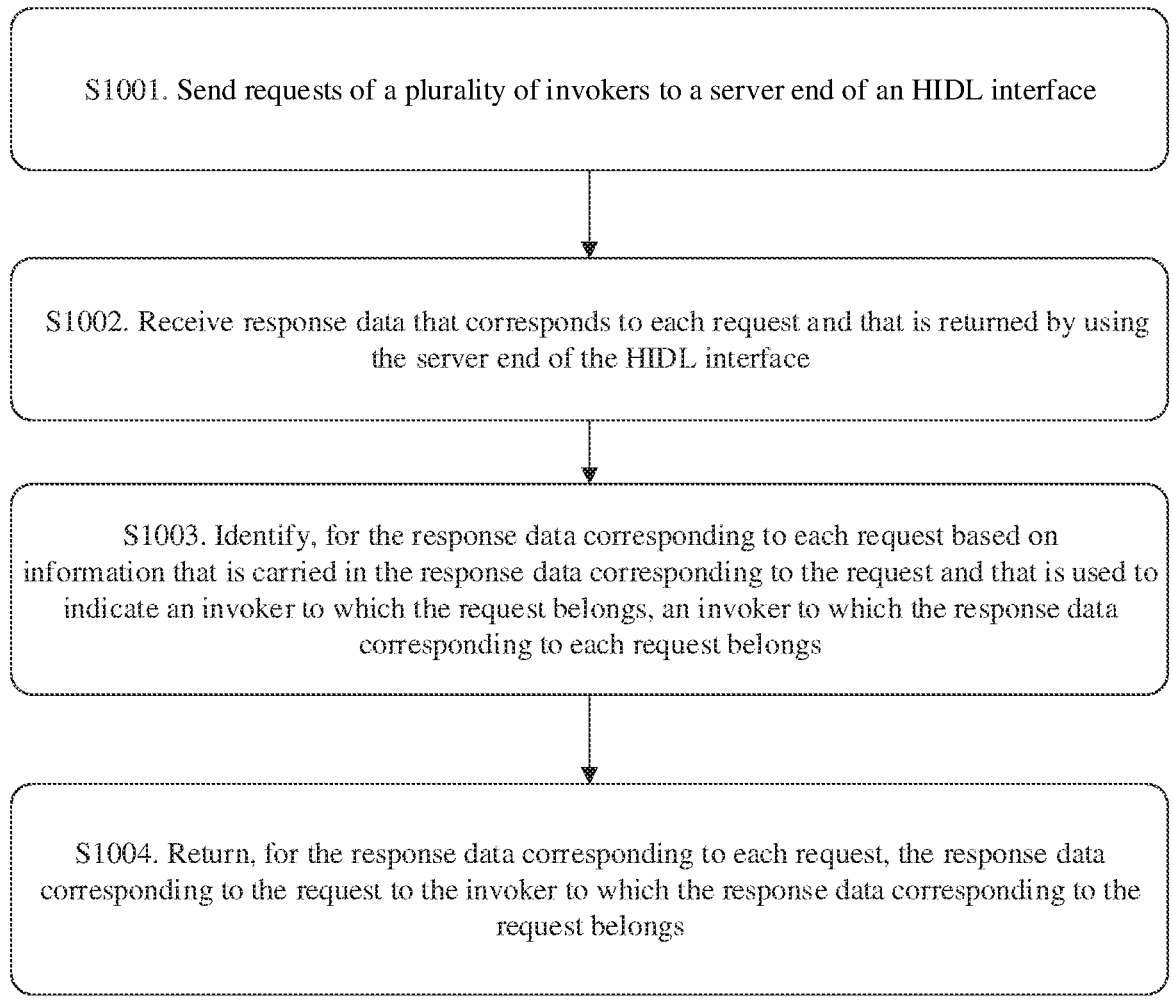
FIG. 10 is a schematic flowchart 6 of a request processing method disclosed in this application.

Referring to FIG. 10, based on the foregoing content, for a scenario of processing requests of a plurality of invokers on a same device, an embodiment of this application further discloses a request processing method. The method is applied to a first device and specifically includes the following steps.

S1001. Send requests of a plurality of invokers to a server end of an HIDL interface.

The request carries information used to indicate the invoker to which the request belongs.

For an execution process and a principle of step S1001, refer to related content in step S403 to step S408 and related content in step S601 and step S602. Details are not described herein again. The HIDL interface mentioned in step S1001 may alternatively be another type of first device interface. This is not limited in this application.

S1002. Receive response data that is corresponding to each request and that is returned through the server end of the HIDL interface.

For an execution process and a principle of step S1002, refer to related content in step S412 and related content in step S604. Details are not described herein again.

S1003. Identify, for the response data corresponding to each request based on the information that is carried in the response data corresponding to the request and that is used to indicate the invoker to which the request belongs, an invoker to which the response data corresponding to each request belongs.

For an execution process and a principle of step S1003, refer to related content in step S413 and related content in step S605. Details are not described herein again.

S1004. Return, for the response data corresponding to each request, the response data corresponding to the request to the invoker to which the response data corresponding to the request belongs.

For an execution process and a principle of step S1004, refer to related content in step S417 and step S418 and related content in step S606. Details are not described herein again.

Figure 11:
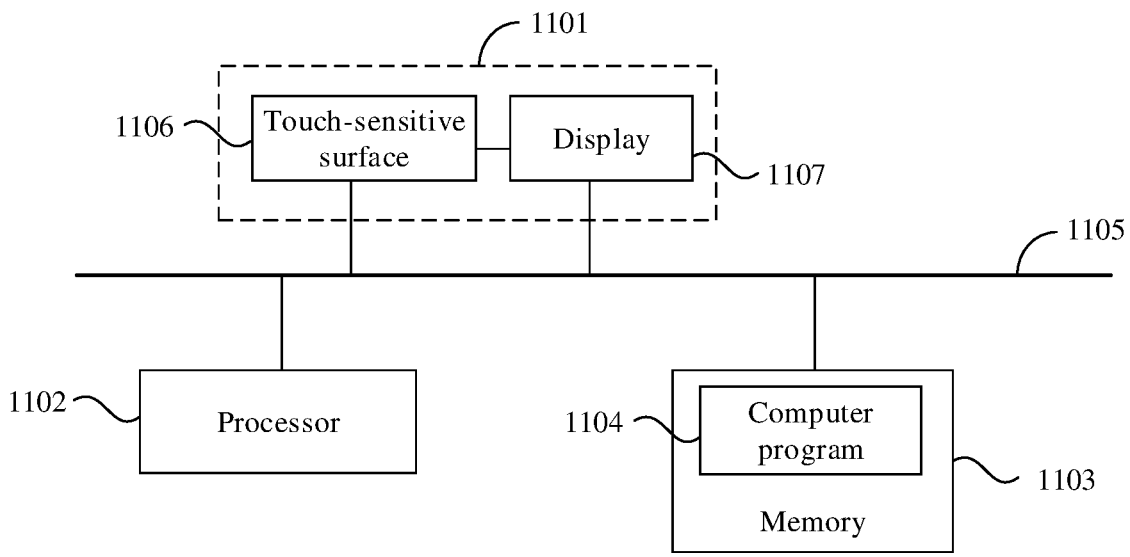
FIG. 11 is an example diagram 2 of composition of an electronic device disclosed in this application.

Some embodiments of this application further provide an electronic device. As shown in FIG. 11, the electronic device may include: a touchscreen 1101, where the touchscreen 1101 may include a touch-sensitive surface 1106 and a display 1107; one or more processors 1102; a memory 1103; and one or more computer programs 1104. The foregoing components may be connected by using one or more communications buses 1105. The one or more computer programs 1104 are stored in the foregoing memory 1903 and configured to be executed by the one or more processors 1102. The one or more computer programs 1104 include instructions. The instructions may be used to perform steps performed by the first device in the corresponding embodiment shown in FIG. 4A and FIG. 4B, steps performed by the second device in the corresponding embodiment shown in FIG. 4A and FIG. 4B, and steps in the corresponding embodiments shown in FIG. 6a to FIG. 10. Certainly, the electronic device shown in FIG. 11 may further include other components such as a sensor module, an audio module, and a SIM card interface. This is not limited in this embodiment of this application. When the electronic device shown in FIG. 11 further includes other components such as a sensor module, an audio module, and a SIM card interface, the electronic device may be the electronic device shown in FIG. 2c.

Figure 12:
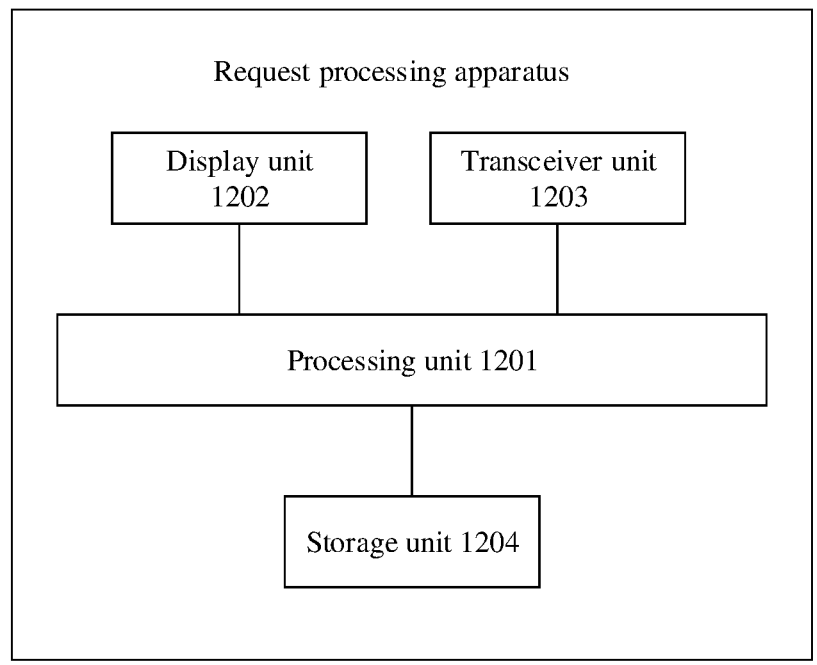
FIG. 12 is a schematic diagram of composition of a request processing apparatus disclosed in this application.

In a case in which each functional module is obtained through division based on each corresponding function, FIG. 12 is a schematic diagram of possible composition of a request processing apparatus. The request processing apparatus can perform steps performed by an electronic device in any one of the method embodiments of this application. As shown in FIG. 12, the request processing apparatus is an electronic device or a communications apparatus that supports an electronic device in implementing the method provided in the embodiments. For example, the communications apparatus may be a chip system. The request processing apparatus may include a processing unit 1201, a display unit 1202, and a transceiver unit 1203.

The processing unit 1201 is configured to support the request processing apparatus in performing the method described in embodiments of this application. For example, the processing unit 1201 is configured to perform or support the request processing apparatus in performing steps performed by the first device in the corresponding embodiment shown in FIG. 4A and FIG. 4B, steps performed by the second device in the corresponding embodiment shown in FIG. 4A and FIG. 4B, and steps in FIG. 6a to FIG. 10.

It should be noted that all related content of each step in the foregoing method embodiment may be cited to a function description of a corresponding function module, and details are not described herein again.

The request processing apparatus provided in this embodiment of this application is configured to perform the method in any one of the foregoing embodiments. Therefore, a same effect as that in the method in the foregoing embodiments can be achieved.

An embodiment further provides a computer-readable storage medium. The computer-readable storage medium includes instructions. When the instructions are run on an electronic device, the electronic device is enabled to perform method steps related to the first device in FIG. 4A and FIG. 4B, to implement the method in the foregoing embodiment, or perform method steps related to the second device in FIG. 4A and FIG. 4B, to implement the method in the foregoing embodiment, or perform related method steps in FIG. 6a to FIG. 10, to implement the method in the foregoing embodiment.

According to the foregoing description of the implementations, a person skilled in the art may clearly understand that, in the several provided embodiments, it should be understood that the disclosed system, apparatus, and method may be implemented in other manners. For example, the described apparatus embodiment is merely an example. For example, division into the modules or units is merely logical function division, and may be other division during actual implementation.

Based on such an understanding, the technical solutions of the embodiments essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments. The foregoing storage medium includes any medium that can store program code, such as a flash memory, a removable hard disk, a read-only memory, a random access memory, a magnetic disk, or an optical disc.

What is claimed is:

1. A request processing method, applied to a first device, wherein the request processing method comprises:
    sending requests of a plurality of invokers to a Server end of a first device interface, wherein the request carries information used to indicate an invoker to which the request belongs;
    receiving response data that corresponds to each request and that is returned by the server end of the first device interface, wherein the response data corresponding to the request carries information used to indicate an invoker to which the request belongs;
    identifying, for the response data corresponding to each request based on the information that is carried in the response data corresponding to the request and that is used to indicate the invoker to which the request belongs, an invoker to which the response data corresponding to the request belongs; and
    returning, for the response data corresponding to each request, the response data corresponding to the request to the invoker to which the response data corresponding to the request belongs,
    wherein the requests of the plurality of invokers comprise a request of an invoker on the first device and/or a request of an invoker on a second device,
    wherein before the sending requests of a plurality of invokers to a Server end of a first device interface, the method further comprises:
    processing, for the request of each invoker, a serial parameter in the request based on an identifier of the invoker, so that a processed serial parameter in the request can be used to indicate the invoker to which the request belongs, wherein the information used to indicate the invoker to which the request belongs is the processed serial parameter in the request; and
    before the returning, for the response data corresponding to each request, the response data corresponding to the request to the invoker to which the response data corresponding to the request belongs, the method further comprises:
    restoring, for the response data corresponding to each request, a processed serial parameter in the response data corresponding to the request.

2. The request processing method according to claim 1, wherein the first device interface is a hardware abstraction layer interface definition language HIDL interface of the first device, and after the sending requests of a plurality of invokers to a Server end of a first device interface, the method further comprises:
    sending a request of each invoker to a modem of the first device by using a server end of the HIDL interface of the first device; and
    processing each request by using the modem of the first device, to obtain the response data corresponding to each request; and
    the receiving response data that corresponds to each request and that is returned by the server end of the first device interface comprises:
    receiving the response data that corresponds to each request and that is returned by the modem by using the server end of the HIDL interface of the first device.

3. The request processing method according to claim 2, wherein the sending a request of each invoker to a modem of the first device by using a server end of the HIDL interface of the first device comprises:
    invoking the server end of the HIDL interface of the first device by using an interface proxy module, to send the request of each invoker to the modem of the first device, wherein the interface proxy module pre-creates a proxy object of a Client end of an HIDL interface corresponding to each invoker; and
    the receiving the response data that corresponds to each request and that is returned by the modem by using the server end of the HIDL interface of the first device comprises:
    receiving, by using the interface proxy module, the response data that corresponds to each request and that is returned by the modem by using the server end of the HIDL interface of the first device.

4. The request processing method according to claim 1, wherein the processing, for the request of each invoker, a serial parameter in the request based on an identifier of the invoker, so that a processed serial parameter in the request can be used to indicate the invoker to which the request belongs comprises:
    offsetting, for the request of each invoker based on the identifier of the invoker, the serial parameter in the request by an offset value corresponding to the invoker, so that the processed serial parameter in the request can be used to indicate the invoker to which the request belongs.

5. The request processing method according to claim 4, wherein the identifying, for the response data corresponding to each request based on the information that is carried in the response data corresponding to the request and that is used to indicate the invoker to which the request belongs, an invoker to which the response data corresponding to the request belongs comprises:
    performing, for the response data corresponding to each request, matching between the processed serial parameter in the response data corresponding to the request and a serial parameter value range corresponding to each invoker, and determining a matched invoker as the invoker to which the response data corresponding to the request belongs.

6. The request processing method according to claim 1, wherein the information used to indicate the invoker to which the request belongs is an identifier of the invoker to which the request belongs; and the receiving response data that corresponds to each request and that is returned by the server end of the first device interface comprises:

receiving, by using a client end of the first device interface, the response data that corresponds to each request and that is returned by the server end of the first device interface, wherein a field used to support receiving of an identifier of each invoker is preset in the client end of the first device interface, and a field used to support receiving of the identifier of each invoker is preset in the server end of the first device interface.

7. The request processing method according to claim 1, wherein if the requests of the plurality of invokers comprise the request of the invoker on the first device and the request of the invoker on the second device, before the sending requests of a plurality of invokers to a Server end of a first device interface, the method further comprises:

processing, for a request of each invoker on the first device, a serial parameter in the request based on an identifier of the invoker, so that a processed serial parameter in the request can be used to indicate the invoker to which the request belongs, or processing, for a request of each invoker on the first device and the second device, a serial parameter in the request based on an identifier of the invoker, so that a processed serial parameter in the request can be used to indicate the invoker to which the request belongs, wherein information used to indicate the invoker to which the request belongs is the processed serial parameter in the request.

8. The request processing method according to claim 7, wherein before the returning, for the response data corresponding to each request, the response data corresponding to the request to the invoker to which the response data corresponding to the request belongs, the method further comprises:

restoring, for response data corresponding to each request belonging to the first device, a processed serial parameter in the response data corresponding to the request, or restoring, for response data corresponding to each request belonging to the first device and the second device, a processed serial parameter in the response data corresponding to the request.

9. The request processing method according to claim 1, wherein after the sending requests of a plurality of invokers to a Server end of a first device interface, the method further comprises:

sending a request of each invoker to a modem of the first device by using the server end of the first device interface; and processing each request by using the modem of the first device, to obtain the response data corresponding to each request.

10. A request processing method, applied to a second device, wherein the request processing method comprises:

sending a request of an invoker on the second device to a first device, so that the first device sends the request of the invoker on the second device to a server end of a first device interface, and receives response data that corresponds to each request and that is returned by the server end of the first device interface, wherein the request carries information used to indicate the invoker to which the request belongs, and the first device and the second device are in a connected state;

receiving response data that corresponds to each request belonging to the second device and that is returned by the first device, wherein an invoker to which the response data corresponding to the request belongs is identified based on information that is carried in the response data corresponding to the request and that is used to indicate the invoker to which the request belongs; and returning, for the response data corresponding to each request, the response data to the invoker to which the response data belongs, wherein before the sending a request of an invoker on the second device to a first device, the method further comprises:

processing, for a request of each invoker on the second device, a serial parameter in the request based on an identifier of the invoker, so that a processed serial parameter in the request can be used to indicate the invoker to which the request belongs, wherein before the returning, for the response data corresponding to each request, the response data to the invoker to which the response data belongs, the method further comprises:

restoring, for the response data corresponding to each request belonging to the second device, a processed serial parameter in the response data corresponding to the request.

11. The request processing method according to claim 10, wherein before the sending a request of an invoker on the second device to a first device, the method further comprises:

receiving a request of an invoker on the first device by using an interface proxy module, wherein the interface proxy module pre-creates a proxy object of a client end of an HIDL interface corresponding to the invoker on the first device and a proxy object of a client end of an HIDL interface corresponding to the invoker on the second device.

12. The request processing method according to claim 10, wherein the processing, for a request of each invoker on the second device, a serial parameter in the request based on an identifier of the invoker, so that a processed serial parameter in the request can be used to indicate the invoker to which the request belongs comprises:

offsetting, for the request of each invoker on the second device based on the identifier of the invoker, the serial parameter in the request by an offset value corresponding to the invoker, so that the processed serial parameter in the request can be used to indicate the invoker to which the request belongs.

13. The request processing method according to claim 10, wherein if the second device has a plurality of invokers, before the returning, for the response data corresponding to each request, the response data to the invoker to which the response data belongs, the method further comprises:

identifying, for the response data corresponding to each request based on the information that is carried in the response data corresponding to the request and that is used to indicate the invoker to which the request belongs, the invoker to which the response data corresponding to the request belongs.

14. The request processing method according to claim 13, wherein the identifying, for the response data corresponding to each request based on the information that is carried in the response data corresponding to the request and that is used to indicate the invoker to which the request belongs, the invoker to which the response data corresponding to the request belongs comprises:

performing, for the response data corresponding to each request, matching between the processed serial parameter in the response data corresponding to the request and a serial parameter value range corresponding to each invoker, and determining a matched invoker as the invoker to which the response data corresponding to the request belongs.

15. An electronic device, comprising one or more processors, a memory, a display, a wireless communications module, and a mobile communications module, wherein the memory, the display, the wireless communications module, and the mobile communications module are coupled to the one or more processors, the memory is configured to store computer program code, the computer program code comprises computer instructions, and when the one or more processors execute the computer instructions, the electronic device performs a request processing method comprising:

sending requests of a plurality of invokers to a Server end of a first device interface, wherein the request carries information used to indicate an invoker to which the request belongs;

receiving response data that corresponds to each request and that is returned by the server end of the first device interface, wherein the response data corresponding to the request carries information used to indicate an invoker to which the request belongs;

identifying, for the response data corresponding to each request based on the information that is carried in the response data corresponding to the request and that is used to indicate the invoker to which the request belongs, an invoker to which the response data corresponding to the request belongs; and returning, for the response data corresponding to each request, the response data corresponding to the request to the invoker to which the response data corresponding to the request belongs, wherein the requests of the plurality of invokers comprise a request of an invoker on the first device and/or a request of an invoker on a second device, wherein before the sending requests of a plurality of invokers to a Server end of a first device interface, the request processing method further comprises:

processing, for the request of each invoker, a serial parameter in the request based on an identifier of the invoker, so that a processed serial parameter in the request can be used to indicate the invoker to which the request belongs, wherein the information used to indicate the invoker to which the request belongs is the processed serial parameter in the request; and before the returning, for the response data corresponding to each request, the response data corresponding to the request to the invoker to which the response data corresponding to the request belongs, the request processing method further comprises:

restoring, for the response data corresponding to each request, a processed serial parameter in the response data corresponding to the request.

\* \* \* \* \*